United States Patent
Painchaud et al.

(10) Patent No.: US 7,352,931 B1
(45) Date of Patent: Apr. 1, 2008

(54) METHOD AND PHASE MASK FOR MANUFACTURING A MULTI-CHANNEL OPTICAL GRATING

(75) Inventors: Yves Painchaud, Sillery (CA); Michel Poulin, Québec (CA); Michel Morin, Sillery (CA)

(73) Assignee: Teraxion Inc., Sainte-Foy (CA)

( * ) Notice: Subject to any disclaimer, the term of this patent is extended or adjusted under 35 U.S.C. 154(b) by 0 days.

(21) Appl. No.: 11/372,454

(22) Filed: Mar. 8, 2006

Related U.S. Application Data

(60) Provisional application No. 60/659,082, filed on Mar. 8, 2005.

(51) Int. Cl.
G02B 6/34 (2006.01)

(52) U.S. Cl. ...................................................... 385/37

(58) Field of Classification Search ...................... None
See application file for complete search history.

(56) References Cited

U.S. PATENT DOCUMENTS

| | | | |
|---|---|---|---|
| 5,327,515 | A | 7/1994 | Anderson et al. |
| 5,367,588 | A | 11/1994 | Hill et al. |
| 6,072,926 | A | 6/2000 | Cole et al. |
| 6,654,521 | B2 | 11/2003 | Sheng et al. |
| 6,707,967 | B2 | 3/2004 | Rothenberg et al. |
| 6,751,381 | B1 | 6/2004 | Popelek et al. |
| 6,865,319 | B2 | 3/2005 | Painchaud |
| 7,200,301 | B2 | 4/2007 | Buryak et al. |
| 2003/0021532 | A1 | 1/2003 | Painchaud |
| 2003/0138206 | A1* | 7/2003 | Sheng et al. ................. 385/37 |
| 2004/0264858 | A1* | 12/2004 | Rothenberg .................. 385/37 |

OTHER PUBLICATIONS

Rothenberg et al., High-Channel-Count Fiber Bragg Gratings Fabricated by Phase-Only Sampling, 2002, pp. 575-577, Proc of OFC 02.*

Bomer, L. et al., Polyphase Barker Sequences, Electronics Letter, Nov. 1989, pp. 1577-1579, vol. 25, No. 23.

Lee, Hojoon et al,. Bandwith Equalization of Purely Phase-Sampled Fiber Bragg Gratings for Broadband Dispersion and Dispersion Slope Compensation, Optics, Express, Nov. 2004, pp. 5595-5602, vol. 12, No. 23.

Morin, Michel et al., Full C-band Slope-Matched Dispersion Compensation Based on a Phase Sampled Bragg Grating, 2004, paper WK1, Proc. of OFC 04.

Ouellette, Francois, Dispersion Cancellation Using Linearly Chirped Bragg Grating Filters in Optical Waveguides, Optics Letters, Oct. 1987, pp. 847-849, vol. 12, No. 10.

Poulin, Michel et al., Apodization of 25 and 50 GHz Low Dispersion FBG WDM Filters by Phase Modulation Coding of a Phase Mask, 2004, paper TuD4, Proc. of OFC 04.

(Continued)

*Primary Examiner*—Michelle Connelly-Cushwa
*Assistant Examiner*—Chad H Smith
(74) *Attorney, Agent, or Firm*—Darby & Darby P.C.

(57) ABSTRACT

A method for manufacturing a complex multi-channel optical grating using a phase mask is presented. A plurality of sub-gratings is designed, each having an individual spectral response designed to produce one of the channels of the multi-channel grating. The target profile of the grating is determined based on the combination of the index profiles of the individual sub-gratings, the target index profile defining a target spectral response of the multi-channel grating. A modified index profile having a smooth apodization profile but providing the same spectral response as the target index profile, at least within a spectral region of interest, is determined and encoded into the phase mask. The phase mask is then used to photoinduce the grating in a photosensitive medium.

50 Claims, 17 Drawing Sheets

OTHER PUBLICATIONS

Rothenberg, Joshua E. et al. High-Channel-Count Fiber Bragg Gratings Fabricated by Phase-Only Sampling, 2002, pp. 575-577, Proc. of OFC 02.

Trepanier, Francois et al., Complex Apodized Holograph Phase Mask for FBG Writing, Sep. 2003, paper WC5, presented at Bragg Gratings Photosensitivity and Poling in Glass Waveguides Conference 2003, Monterey, CA, USA.

Kashyap, R. "Chapter 7: Chirped Fiber Bragg Gratings", Academic Press, 1999 311-353.

* cited by examiner

METHOD AND PHASE MASK FOR MANUFACTURING A MULTI-CHANNEL OPTICAL GRATING

FIELD OF THE INVENTION

The present invention relates to the field of optical components and more particularly concerns a method and phase mask for manufacturing optical gratings in which each channel has an individually designed spectral response.

BACKGROUND OF THE INVENTION

The Fiber Bragg grating (FBG) is a well established technology for applications in optical telecommunications, especially for Wavelength-Division-Multiplexing (WDM). Basically, a FBG reflects light propagating into an optical fiber at a wavelength known as the Bragg wavelength, which is determined by the period of the grating and the fiber effective index. A chirped FBG, in which the grating period varies as a function of the position along the fiber, is a well known solution for compensating the chromatic dispersion of an optical fiber link (see for example F. Ouellette, "Dispersion cancellation using linearly chirped Bragg grating filters in optical waveguides," Opt. Lett., Vol. 12, pp. 847-849 (1987); and R. Kashyap, "*Fiber Bragg gratings*," Academic Press, 458p. (1999)). Such a grating can compensate for the dispersion accumulated over an optical fiber link by providing a group delay that varies as a function of wavelength in a manner opposite to that of the group delay in the fiber link.

From the many available methods for the photo-inscription of FBG, the use of a phase mask is recognized as the best choice for obtaining good optical performance (see for example U.S. Pat. No. 5,367,588 (HILL et al) and U.S. Pat. No. 5,327,515 (ANDERSON et al). The phase mask acts as a master that is used to replicate FBGs with the same optical characteristics on pieces of optical fiber in a fast and repeatable way, allowing for efficient mass production. The phase mask can contain all the information about the FBG to be written or only part of it, depending on the desired balance between ease of fabrication and flexibility.

Although the use of a phase mask was initially limited to the inscription of the period profile of a single channel FBG, recent advances have made possible the encoding of the multi-channel character through phase sampling, as shown in U.S. Pat. No. 6,707,967 (ROTHENBERG et al). In a further development, the in-mask encoding of the apodization profile of the FBG was proposed in U.S. patent application published under no. 2004/0264858 (ROTHENBERG). The whole information related to a FBG can thus be encoded into the phase mask, hence maximizing its manufacturability. In practice, this means that a binary phase mask with properly positioned groove edges can be used to write a FBG with a complex spectral response using a uniform exposition to actinic radiation.

While FBGs were initially considered as narrow-band single-channel devices, several advances have been made during the past few years leading to the fabrication of multi-channel FBGs. Assignee's own U.S. Pat. No. 6,865,319 (PAINCHAUD) teaches that the multi-channel optical response can be obtained by superposing different FBGs on the same piece of fiber, each of them being associated with a specific WDM channel. This has the advantage of maximizing flexibility since the optical response of the final structure can be tailored on a per-channel basis. However, a long writing time is required for the channel per channel inscription and the required total index change is high and increases with the number of superposed FBGs. For example, FIG. 1A (PRIOR ART) shows the simulated amplitude profile of the change in index of refraction resulting from the superposition of 8 grating components providing a dispersion varying from 400 to 1800 ps/nm in channels separated by 100 GHz, as illustrated in FIGS. 1E and 1F (PRIOR ART). FIG. 1B (PRIOR ART) shows the corresponding period profile. FIG. 1D shows that reflectivity peaks are created only in the spectral region of interest, i.e. there is no side band produced by this process. FIG. 1G (PRIOR ART) shows the group delay ripple, defined as the deviation of the group delay spectrum from a straight line. FIG. 1C shows the Fourier spectrum of the phase profile. In this example, each FBG component is considered to be written using an apodization technique such as the moving phase mask method described in U.S. Pat. No. 6,072,926 (COLE et al). If the maximum index change is desired to be minimized, the relative phases between the 8 components can be selected in an appropriate manner such as using Barker series, as taught in L. Bömer, M. Antweiler, "*Polyphase Barker sequences*," Electron. Lett., Vol. 25 (23), pp. 1577-1579 (1989). In the example of FIG. 1, the 8 components are centered on the overall structure, although there are of different lengths. Other spatial management could also be of interest for minimizing the maximum index change. For example some components could be located at one edge of the structure while other at the center or at the other edge.

The prior art embodiment of grating superposition at the writing stage is somewhat inefficient as a uniform index increase is created during the inscription of each individual component. These uniform index increases add up linearly as the grating components are superposed, whereas partial fringe wash-out during the superposition process reduces the overall index modulation. This uniform index offset shifts uniformly the spectral response of the overall FBG but does not contribute otherwise in shaping the grating optical response. The ratio of the uniform index offset on the peak index change increases with the number of grating components. Accordingly, the inefficiency of superposing individual gratings is worst for high-channel-count structures. An ideal writing procedure would produce the same index modulation but around an average index change lowered by the index offset.

FBG sampling, as for example described in U.S. Pat. No. 6,707,967 (ROTHENBERG et al), is an attractive alternative to superposing FBGs, especially when performed on the grating phase rather than on the grating amplitude. In this technique, the multi-channel character is encoded directly into the phase mask and the whole complex FBG structure can be created in a single inscription step. This method has the advantage of being fast and suitable for mass production. However, the achievable optical characteristics are somewhat limited. Uniform sampling produces identical replicas in the spectral response (J. E. Rothenberg, R. F. Caldwell, H. Li, Y. Li, J. Popelek, Y. Sheng, Y. Wang, R. B. Wilcox and J. Zweiback, "*High-channel count fiber Bragg gratings fabricated by phase-only sampling*," Proc. of OFC 02, pp. 575-577 (2002)). Chirped sampling allows dispersion to differ somewhat from channel to channel, but in a limited manner (M. Morin, M. Poulin, A. Mailloux, F. Trépanier and Y. Painchaud, "*Full C-band slope-matched dispersion compensation based on a phase sampled Bragg grating*," Proc. of OFC 04, paper WK1 (2004)). The dispersion variation comes along with a concomitant bandwidth variation from channel to channel, clearly an undesirable feature. The channel-to-channel dispersion variation that can be achieved with chirped sampling is thus rather limited.

Lee et al. ("*Bandwidth equalization of purely phase-sampled fiber Bragg gratings for broadband dispersion and dispersion slope compensation*," Opt. Express, Vol. 12 (23) p. 5595-5602 (2004)) proposed an approach for fabricating a multi-channel dispersion compensation FBG in which the dispersion varies but the bandwidth remains relatively uniform from channel to channel. This approach is based on phase sampling in which the coupling coefficient is also chirped (in addition to the grating and sampling periods being chirped). However, this approach only provides some improvement for still modest channel-to-channel dispersion variations.

There is thus a need for a multi-channel dispersion compensating device in which the dispersion can significantly differ from channel to channel whilst the channel bandwidth remains relatively uniform. Such a device would be of particular interest to compensate for the chromatic dispersion accumulated over many WDM channels along transport fibers such as NZ-DSF fibers, in which the spectral variation of the dispersion is relatively large, or to compensate for the residual dispersion after propagation over a long link with incomplete dispersion slope compensation. There is also a need that such a device be produced in a manner compatible with mass production. Use of a complex phase mask containing most of the FBG structure complexity (or at least the multi-channel character) is thus certainly of interest.

SUMMARY OF THE INVENTION

In accordance with a first aspect of the invention, there is therefore provided a method for manufacturing a multi-channel optical grating in a photosensitive medium, where each channel of the multi-channel grating has an individual spectral response. The method generally includes the steps of:

a) for each channel, individually designing an index profile of a sub-grating providing the corresponding individual spectral response;

b) determining a target index profile of the multi-channel grating based on a combination of the index profiles of the sub-gratings, the target index profile defining a target spectral response of the optical grating;

c) determining a modified index profile having a smooth apodization profile and providing the target spectral response at least within a spectral region of interest;

d) encoding a phase mask according to the modified index profile; and e) photoinducing the multi-channel grating in the photosensitive medium using this phase mask.

In accordance with another aspect of the invention, there is also provided a method for manufacturing a phase mask for photoinducing a multi-channel optical grating in a photosensitive medium. Each channel of the multi-channel grating has an individual spectral response. The method includes the steps of:

a) for each channel, individually designing an index profile of a sub-grating providing the corresponding individual spectral response;

b) determining a target index profile of the multi-channel grating based on a combination of the index profiles of the sub-gratings, the target index profile defining a target spectral response of the optical grating;

c) determining a modified index profile having a smooth apodization profile and providing the target spectral response at least within a spectral region of interest; and d) encoding the phase mask according to the modified index profile.

In accordance with yet another aspect of the invention, there is also provided a phase mask for manufacturing a multi-channel optical grating, each channel of the multi-channel grating having an individual spectral response. The phase mask includes a plurality of grating corrugations having a periodical spatial distribution, this spatial distribution being encoded according to an index profile having a smooth apodization profile and providing a spectral response within a spectral region of interest corresponding to a target spectral response of the multi-channel optical grating. The target spectral response is defined by a target index profile based on a combination of index profiles of a plurality of sub-gratings, the index profile of each sub-grating being selected to provide the individual spectral response of a corresponding one of the channels.

Advantageously, the present invention provides a technique which may be used for the fabrication of multi-channel dispersion compensation FBG in which the dispersion varies from channel to channel while the channel bandwidth remains uniform. Preferably, the grating reflects light at wavelengths within a series of spectral bands, each band corresponding to a WDM channel. The FBG is preferably obtained by illuminating the core of an optical fiber with a UV beam or other sort of actinic radiation through a phase mask. In one embodiment, the period profile, the multi-channel character and at least part of the apodization profile of the FBG are encoded into the phase mask allowing for a fabrication technique suitable for mass production.

Other features and advantages of the present invention will be better understood upon reading of preferred embodiments thereof with reference to the appended drawings.

BRIEF DESCRIPTION OF THE DRAWINGS

FIGS. 4A and 4B shows the reflectivity and group delay spectra respectively. FIG. 4C shows the group delay spectrum. FIG. 4D shows the dispersion values of each channel (dots) in comparison with the target (solid line).

DESCRIPTION OF PREFERRED EMBODIMENTS OF THE INVENTION

Figure 1A:
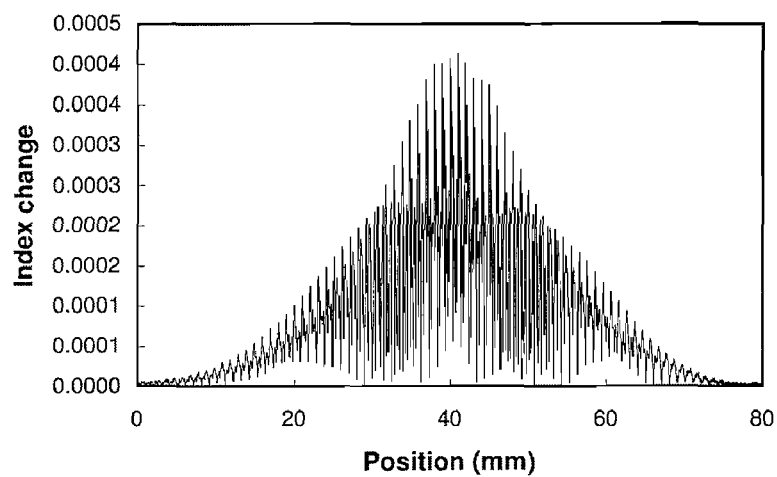
FIGS. 1A to 1G (PRIOR ART) are graphs respectively showing the apodization profile (FIG. 1A), the period profile (FIG. 1B), the phase spectrum as a function of spatial frequency (FIG. 1C), the reflectivity spectra on a large and a small wavelength scale (FIGS. 1D and 1E), the group delay spectra (FIG. 1F) and the group delay ripple (FIG. 1G) of an 8-channel grating obtained by successively superposing eight individual grating profiles.
Figure 1B:
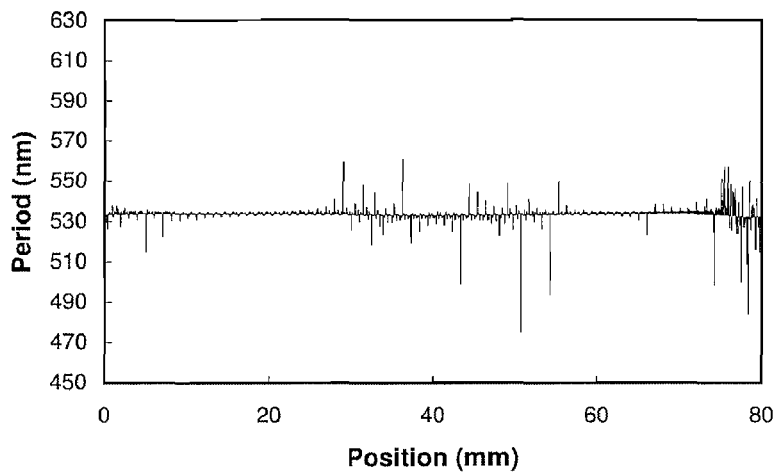
Figure 1C:
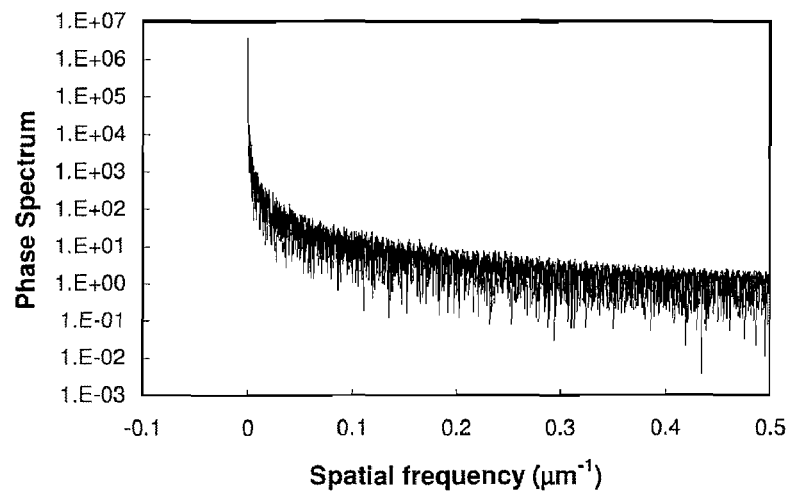
Figure 1D:
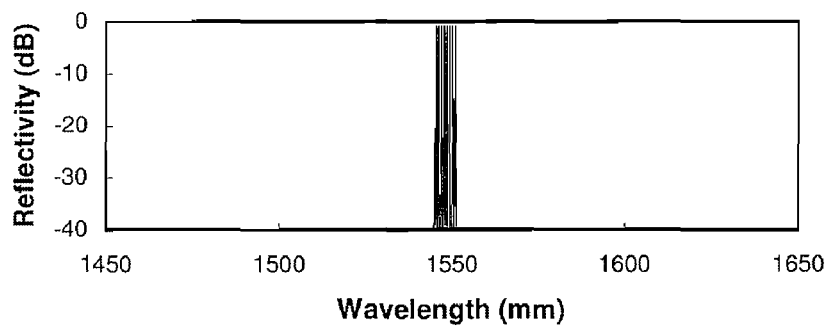
Figure 1E:
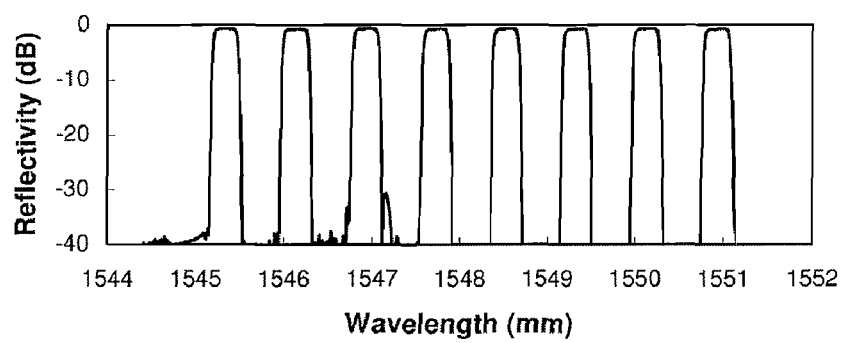
Figure 1F:
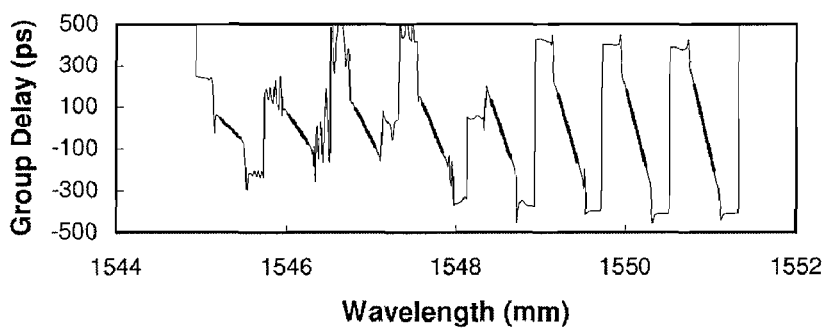
Figure 1G:
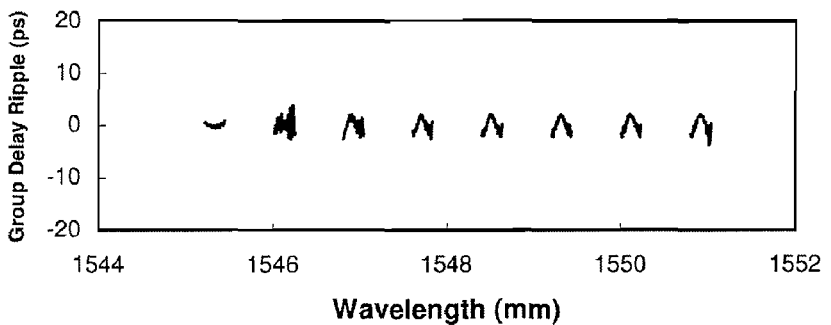

The present invention provides a method for manufacturing a multi-channel optical grating in a photosensitive medium, a phase mask for this purpose and a method for manufacturing such a phase mask. Although the description below will mainly refer to FBGs, it will be understood by one skilled in the art that the present invention may be applied to the manufacturing of periodic refractive index profiles in any appropriate photosensitive medium, for example waveguides such as optical fibers and planar waveguides. By multi-channel, it is meant that the optical grating has a spectral response showing a plurality of generally periodical reflection or transmission features. For many applications, for example in the telecommunications industry, it is often desirable that the channels be of uniform width and spacing, but the present invention could equally be applied to cases where it is not so.

Recent advances on the production of multi-channel FBGs using a complex phase mask in which the multi-channel character is encoded were all based on a conventional phase sampling approach. In this approach, only the central channel is designed. Replicas of this unique design over the spectrum are then obtained through the sampling. The spectral characteristics of the different channels, in particular the dispersion, can be varied from channel-to-channel by providing a chirp on the sampling period. Even in this case, the optical characteristics of each channel however directly depend on the design of the central channel.

Oppositely, the present invention takes into consideration the desired individual spectral response of each channel, and encodes a single complex phase mask based on a set of individual grating designs. The expression "spectral response" in the present context generally refers to the reflectivity characteristics of a grating or sub-grating as a function of wavelength. In general terms, the method according to a first aspect of the invention includes the following steps:

a) for each channel, individually designing a profile of a sub-grating providing the corresponding individual spectral response;

b) determining a target index profile of the multi-channel grating based on a combination of the index profiles of the sub-gratings. The target index profile defines a target spectral response of the optical grating;

c) determining a modified index profile having a smooth apodization profile and providing the target spectral response at least within a spectral region of interest;

d) encoding a phase mask according to the modified index profile; and e) photoinducing the multi-channel grating in the photosensitive medium using this phase mask.

In step a) of this method, a number of sub-gratings are individually designed, each corresponding to one channel. Each sub-grating is therefore equivalent to a single-channel grating providing the required spectral response for the corresponding channel only. The designing of single-channel gratings is well known to those skilled in the art. Preferably, each sub-grating is attributed an individual apodization profile and an individual phase profile, which are adjusted according to the desired spectral characteristics of the corresponding channel. These characteristics include the channel central wavelength and bandwidth, and may advantageously include dispersion characteristics such as the dispersion value and intra-channel dispersion slope. For applications in optical telecommunications, the bandwidth of each channel will be the same and their central wavelengths will be evenly spaced. A discussion on these concepts may for example be found in U.S. Pat. No. 6,865,319 (PAINCHAUD), which is incorporated herein by reference.

Step b) of the present method involves determining the target index profile of the entire grating, i.e. the refractive index modulation to be transferred to the photosensitive medium. It will be understood by one skilled in the art that in the context of FBGs, the index profile refers to the modulation of the effective index of the optical fiber. The target profile is based on the combination of the individual profiles of all the sub-gratings, and may for example include the mathematical sum of those individual profiles. It will be understood that the target profile may actually be mathematically represented in a number of fashion, depending on how the different terms are defined. It will also be understood that terms additional to the sub-grating profiles may be incorporated in the target profile, such as an index offset term as will be shown in one embodiment explained below.

For complex multi-channel gratings, the target index profile obtained through step b) often has a complex apodization profile including fast longitudinal variations along the optical axis of the multi-channel grating. Such apodization variations can be technically difficult to encode in a phase mask. In step c) a modified index profile is determined, which provides the same spectral response as the target profile within a region of interest, yet has a smooth apodization profile. It will therefore be possible to encode this modified index profile in a phase mask using standard techniques while the apodization would be possible to be realized with means such as varying the UV power or using the moving mask method.

It will be understood by one skilled in the art that the spectral responses of the modified and target index profiles need not be absolutely identical, but will be considered as being the "same" if the reflectivity features of the corresponding grating are sufficiently similar for the purposes of the particular application the grating is to serve. The spectral region of interest will also be determined by the context of a particular application, and generally refers to the wavelength range within which the grating is to be used. For example, in the context of optical telecommunications, guided light beams usually have wavelengths within specific infrared communication bands; the effects of the multichannel grating on light of a wavelength outside of this band will therefore have no impact on the operation of the system incorporating this grating. As will be seen further below for an embodiment of the present invention, this feature may be taken advantage of as any appropriate manner of determining the target index profile, the modified index profile and corresponding technique to encode the corresponding information in the phase mask may be used, as will be clearly understood by one skilled in the art. By way of example, two general approaches of embodying steps b), c) and d) will be explained herein below.

Translation of Apodization Features into Phase

As mentioned above, it is known from U.S. Pat. No. 6,865,319 to superpose the desired sub-gratings during the writing process to obtain a final multi-channel structure. In the present embodiment, instead of superposing the sub-gratings one by one during the writing process, they are superposed or otherwise combined mathematically in order to obtain the complex target index profile to be fabricated. Each sub-grating can be represented as a function of an individual apodization profile $\Delta n_k(z)$ and an individual phase profile $\theta_k(z)$, and the target index profile can be expressed mathematically as:

$$\Delta n_{struct}(z) = \Delta n_{offset} + \sum_k \Delta n_k(z) e^{i(\theta_k(z) + \phi_k)}, \quad (1)$$

where $\phi_k$ are the relative phases between the sub-gratings and $\Delta n_{offset}$ is the index offset required to make the total index change strictly positive. This target index profile defines a multi-channel grating which has a target spectral response reproducing the individual spectral response of each sub-grating.

The target index profile can also be expressed as:

$$\Delta n_{struct}(z) = \Delta n_{offset} + \Delta n_a(z) e^{i\theta(z)}, \quad (2)$$

where $\Delta n_a(z)$ and $\theta(z)$ are the overall apodization and phase profiles of the target index profile, respectively. This representation by complex numbers is useful since the overall apodization and phase profiles can be easily obtained by the following expressions:

$$\Delta n_a(z) = |\Delta n_{struct}(z) - \Delta n_{offset}|, \quad (3)$$

$$\theta(z) = \tan^{-1}\left(\frac{\text{imag}(\Delta n_{struct}(z) - \Delta n_{offset})}{\text{real}(\Delta n_{struct}(z) - \Delta n_{offset})}\right). \quad (4)$$

The phase profile $\theta(z)$ may also be expressed as a period profile $p(z)$ defined as:

$$p(z) = 2\pi \left(\frac{d\theta(z)}{dz}\right)^{-1}. \quad (5)$$

The period profile is of interest for representation purposes. It allows better highlighting the fine structures.

Directly writing this complex target index profile is more efficient than superposition during the writing process by adjusting $\Delta n_{offset}$ so that $\Delta n_{struct}(z)$ goes all the way down to zero, thus getting rid of the aforementioned uniform index offset. Obviously, the optical characteristics remain the same apart from a wavelength shift due to the difference in the average index change. Moreover, the overall apodization profile $\Delta n_a(z)$ depends on the phases $\phi_k$ between the sub-gratings and its peak value can be minimized by a suitable phase optimization. The optimal phases $\phi_k$ can be easily encoded in the phase mask. Ensuring their realization while superposing gratings during the writing procedure as in the prior art is much more difficult.

The period profile p(z) resulting from the mathematical superposition varies as a function of position z along the grating. It typically varies more rapidly as the overall bandwidth of the multi-channel grating increases. Fine longitudinal features in the period profile p(z) can be encoded into the phase mask. Features even smaller than the writing UV beam can be encoded suitably in the phase mask. For such small structures, diffractive effects taking place between the phase mask and the photosensitive medium receiving the grating during the writing procedure are preferably taken into account. As taught in U.S. Pat. No. 6,654,521 (SHENG et al.), which is incorporated herein by reference, the phase of the target index profile is related to the phase in the mask through a transfer function. This link is preferably represented by the following expression:

$$S(f) = S_m(f) \cdot 2 \cos(\pi f \Delta z), \quad (6)$$

where $S_m(f)$ and $S(f)$ are the Fourier spectra of the mask phase shift profile $\Delta \theta_m(Z)$ and the target phase shift profile $\Delta \theta(z)$, f is the spatial frequency of the periodic phase structure of the phase mask (or the fiber grating) and $\Delta z$ is the distance between two points along the phase mask axis from which pass two beams interfering on the fiber core at position z. The target fiber phase shift profile $\Delta \theta(z)$ is related to the overall phase profile $\theta(z)$ by:

$$\theta(z) = \frac{2\pi}{p_{av}} + \Delta \theta(z), \quad (7)$$

where $p_{av}$ is the average period of the fiber Bragg grating. In the same manner, the mask phase shift profile $\Delta \theta_m(Z)$ is related to the total mask phase profile $\Delta_m(z)$ by:

$$\theta_m(z) = \frac{2\pi}{\Lambda_{av}} + \Delta \theta_m(z), \quad (8)$$

where $\Lambda_{av}$ is the average period of the phase mask.

It can be seen from Equation (6) that some phase periodicities are not or are weakly transferred into the photosensitive medium since the transfer function contains some zeros. These phase periodicities could be avoided as far as possible.

The overall apodization profile $\Delta n_a(z)$ is also seen to vary rapidly along the optical axis of grating. The size of the UV writing beam will in general limit the smallest longitudinal features in the apodization profile that can be realized with usual methods (such as varying the UV power or using the moving mask method). In accordance with one aspect of the present invention, this limitation may be circumvented as their are means to transfer fine structures of the overall apodization profile into phase-only fines structures, while keeping the optical properties of the grating virtually the same within the spectral range of interest.

One of the means for transferring apodization structures into phase is through a phase modulation approach. The encoding of an FBG apodization profile into a phase mask was recently proposed in U.S. patent application no. 2004/0264858, which is incorporated herein by reference. In this approach, the overall apodization profile is replaced by a phase apodization component, which is adjusted to reproduce the spectral response of the optical grating within its spectral region of interest while generating spurious reflection features outside of this spectral region of interest. In this manner, the overall apodization profile is performed by modulating periodically the phase of the corrugations along the phase mask. This periodic phase modulation decreases the grating efficiency at the original grating wavelength and provides reflectivity at wavelength sidebands on each side of the original grating wavelength. The wavelength separation between the sidebands is dictated by the frequency of the phase modulation. A large enough frequency ensures that the created sidebands lie outside of the spectral range of interest. The local amplitude of the phase modulation is adjusted to obtain the desired local apodization level. It has already been demonstrated that a smooth apodization profile can be encoded into a phase mask in this manner. It has been found in realizing the present invention that the rapid longitudinal variations of the overall apodization profile $\Delta n_a(z)$ can be encoded into a phase mask as a periodic phase modulation with rapidly varying amplitude, as long as diffraction effects are taken into account as aforementioned. The target profile to be encoded in the phase mask can thus be obtained by a phase-only translation of the overall apodization and phase profiles $\Delta n_a(z)$ and $\theta(z)$.

More precisely, in accordance with a preferred embodiment of the invention this phase modulation approach involves replacing the target index profile expressed by Equation (2) by a modified index profile $\Delta n_{struct,\ mod}(Z)$ which can be represented by the following expression:

$$\Delta n_m(z) = \Delta n_{offset} + \Delta \tilde{n}_a(z) \cdot \exp\left(i\left(\theta(z) + \phi_a(z)\sin\left(\frac{2\pi z}{p_a}\right)\right)\right). \quad (9)$$

As can be seen, the finely structured overall apodization profile $\Delta n_a(z)$ of Equation (2) has been replaced by a smooth apodization profile $\Delta \tilde{n}_a(z)$, the fine structures having been translated into the overall phase profile through the addition of a phase apodization component.

The modified apodization profile $\Delta \tilde{n}_a(z)$ can be chosen to be uniform or to vary smoothly as a function of z, for example like the envelope of the initial overall apodization profile $\Delta n_a(z)$. The phase apodization component is preferably represented as a spatially varying phase modulation having an amplitude $\phi_a(Z)$.

The modified index profile of Equation (9) corresponds to a grating having virtually the same spectral response within the spectral region of interest as the original grating, provided that the apodization period $p_a$ is small enough to produce reflection features outside of the spectral region of interest and provided that the spatially varying phase modulation amplitude $\phi_a(z)$ is given by:

$$\phi_a(z) = J_0^{-1}\left(\frac{\Delta n_a(z)}{\Delta \tilde{n}_a(z)}\right). \quad (10)$$

Figure 2A:
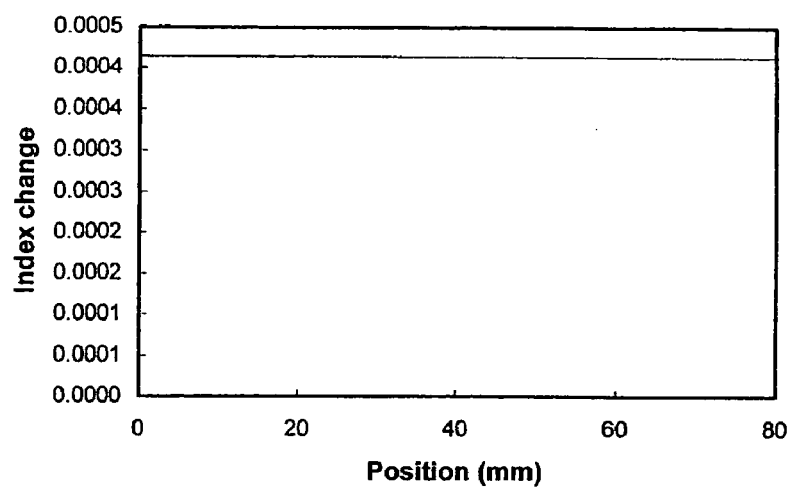
FIGS. 2A to 2G are similar graphs as shown in FIGS. 1A to 1G for an 8-channel grating obtained using an embodiment of the present invention, where the apodization profile has been completely translated into the phase profile of the target profile and fully encoded in the phase mask through a phase modulation method.
Figure 2B:
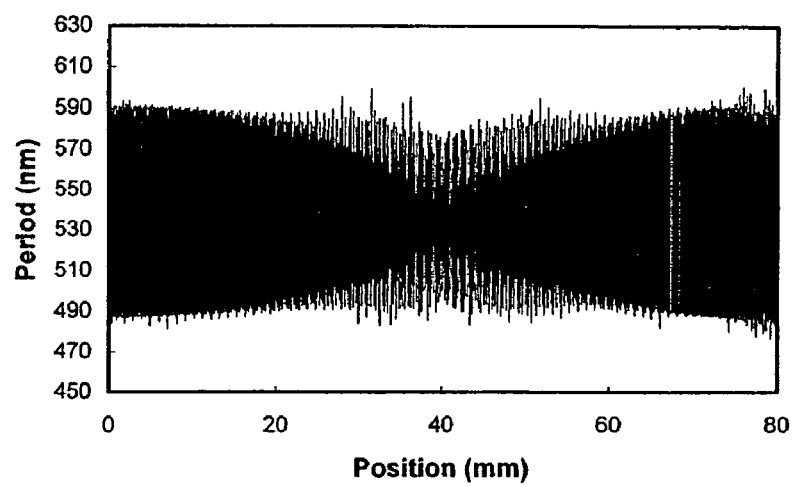
Figure 2C:
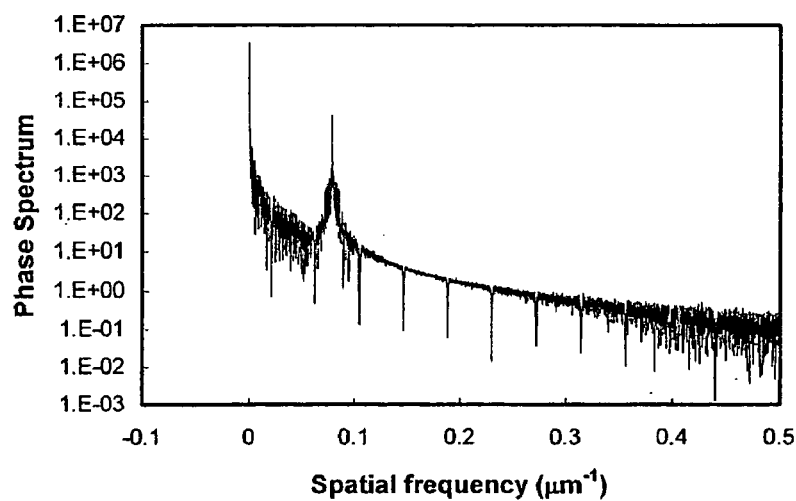
Figure 2D:
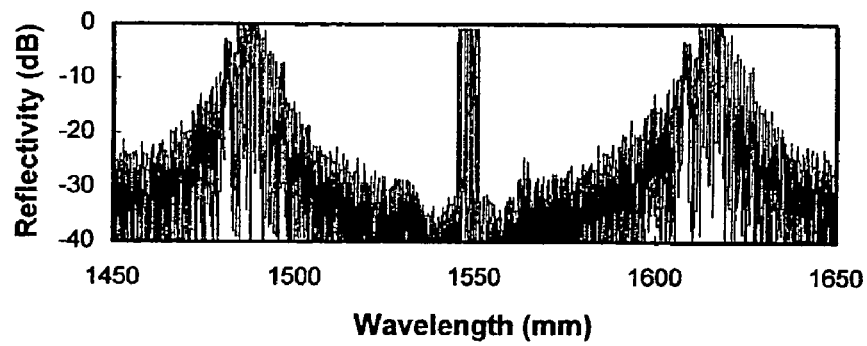
Figure 2E:
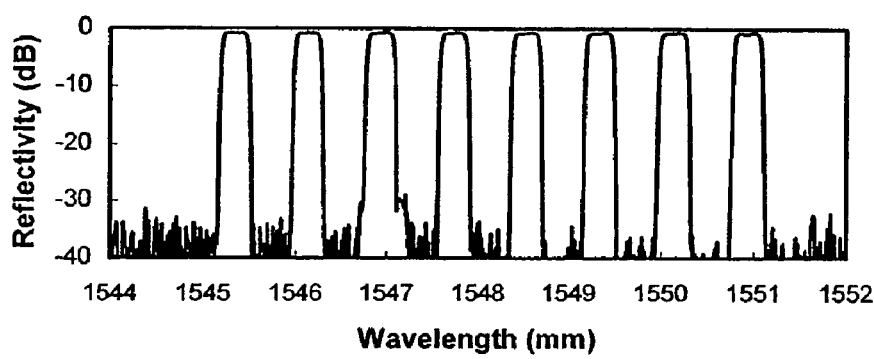
Figure 2F:
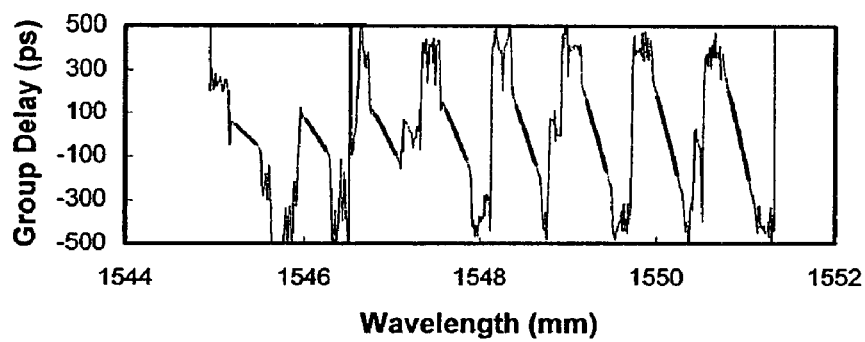
Figure 2G:
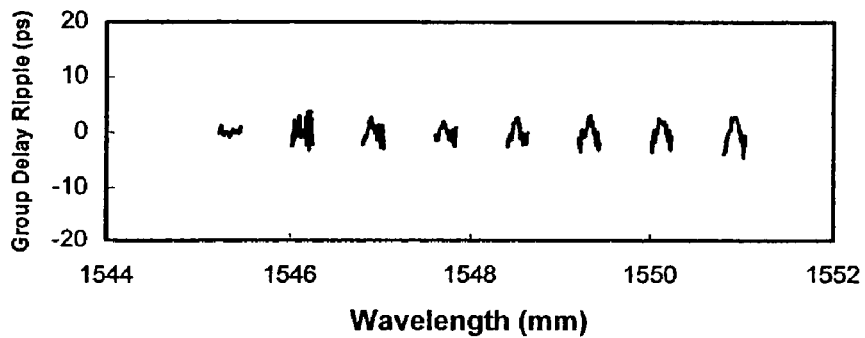
Figure 3A:
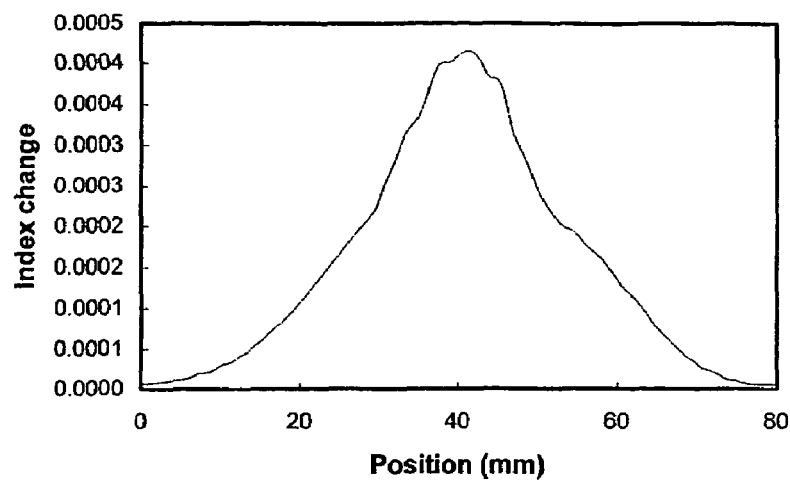
FIGS. 3A to 3G are similar graphs as those of FIGS. 1A to 1G for an 8-channel grating obtained using another embodiment of the present invention, encoding only the fast longitudinal variations of the apodization profile into the phase mask, while producing the slowly varying apodization envelope through a phase modulation method.
Figure 3B:
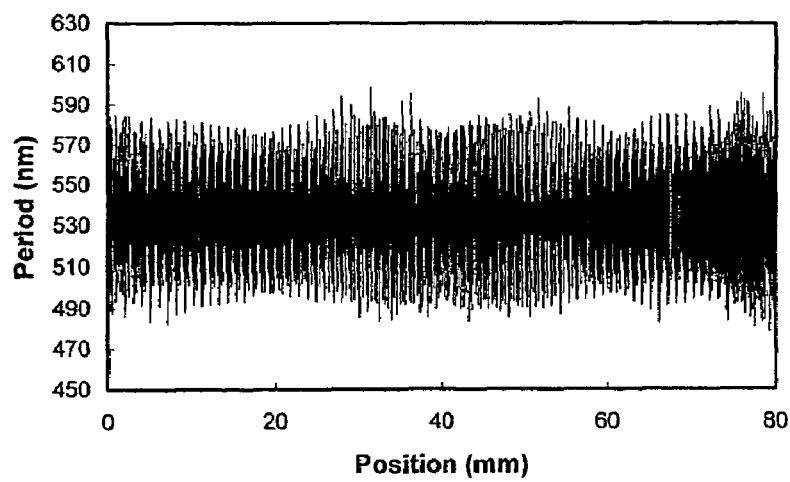
Figure 3C:
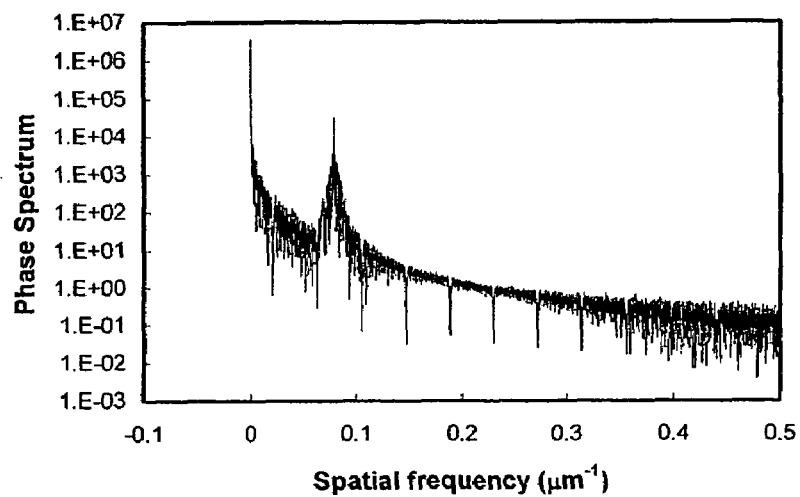
Figure 3D:
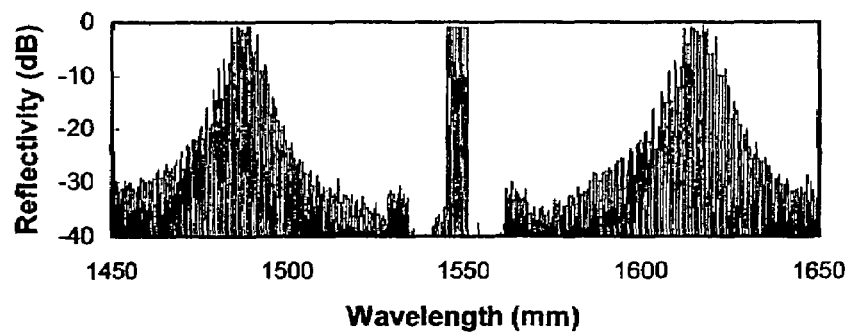
Figure 3E:
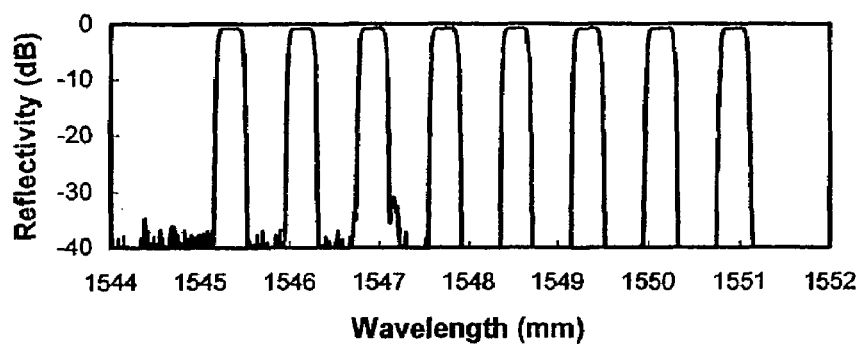
Figure 3F:
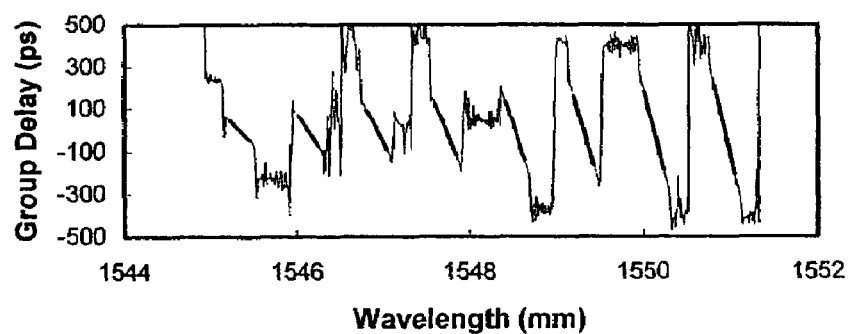
Figure 3G:
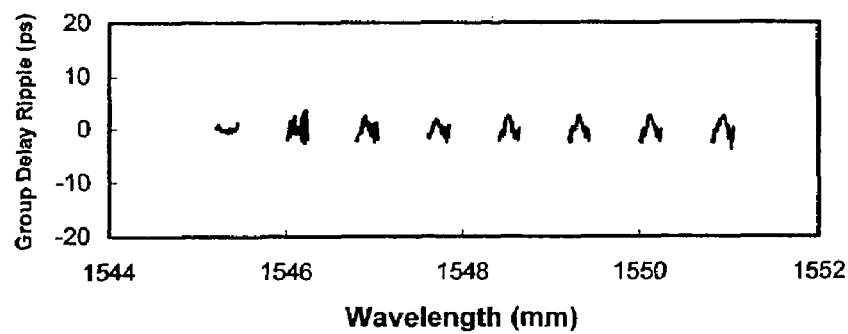

For example, FIGS. 2A to 2G shows the physical and spectral profiles of an 8-channel FBG, having the same desired spectral response as the prior art grating of FIGS. 1A to 1G, translated as a phase-only target profile, taking into account the diffraction effects between the mask and the optical fiber during the writing of the FBG. As can be seen in FIG. 2A, the index modulation amplitude is now constant along the grating. The overall apodization profile has been transferred completely to the overall phase profile. This explains that the period profile, shown in FIG. 2B, differs significantly from that shown in FIG. 1B. In FIG. 2D, it can be shown that Side bands are created by the phase modulation, although virtually without affecting the optical characteristics, as shown in FIGS. 2E to 2G. The spectral regions where the side bands occur is dictated by the choice of the apodization period $p_a$. The presence of an apodization period is also visible as a peak on the phase spectrum as shown in FIG. 2C (with comparison to FIG. 1C).

It will be noted that the optical characteristics of the optical grating are slightly degraded by the phase-translation process, but remain quite acceptable for most targeted applications. This slight degradation in the optical response comes along however with a sizeable increase in the manufacturability of the device.

It is not necessary to encode the full overall apodization profile into the phase mask. FIGS. 3A to 3G illustrate for example a different realization of the desired FBG by encoding only the fast longitudinal variations of the apodization profile into the phase mask, while producing the slowly varying apodization envelope with another technique (such as the moving phase mask method). In this case, the fabrication procedure is slightly complicated but the degradation of the optical characteristics is reduced.

Figure 4A:
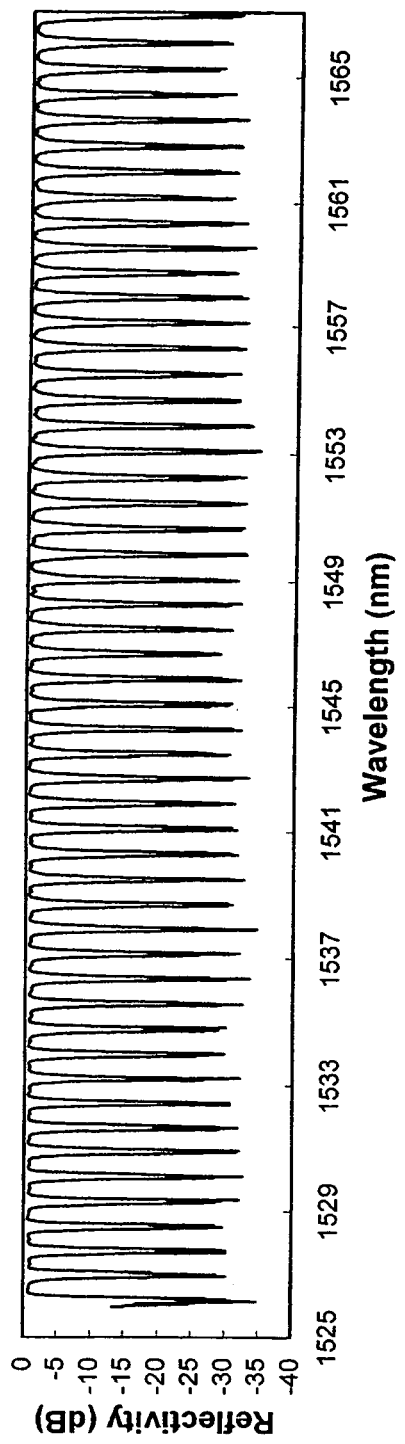
FIGS. 4A to 4D are graphs of the optical characteristics of an FBG fabricated using the present invention, in particular using the embodiment where fast longitudinal variations of the apodization profile were transferred into phase through a phase modulation method.
Figure 4B:
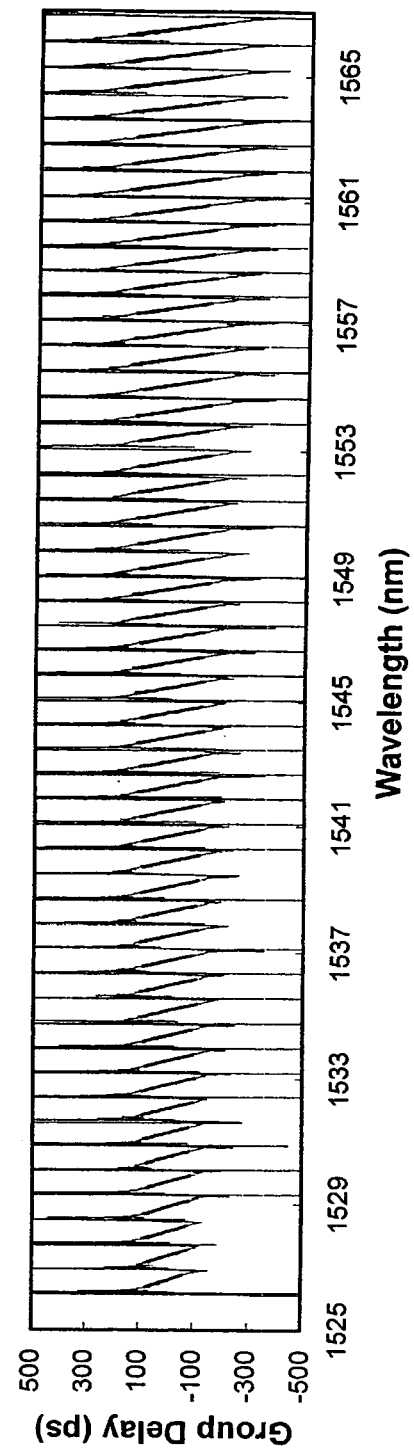
Figure 4C:
Figure 4D:
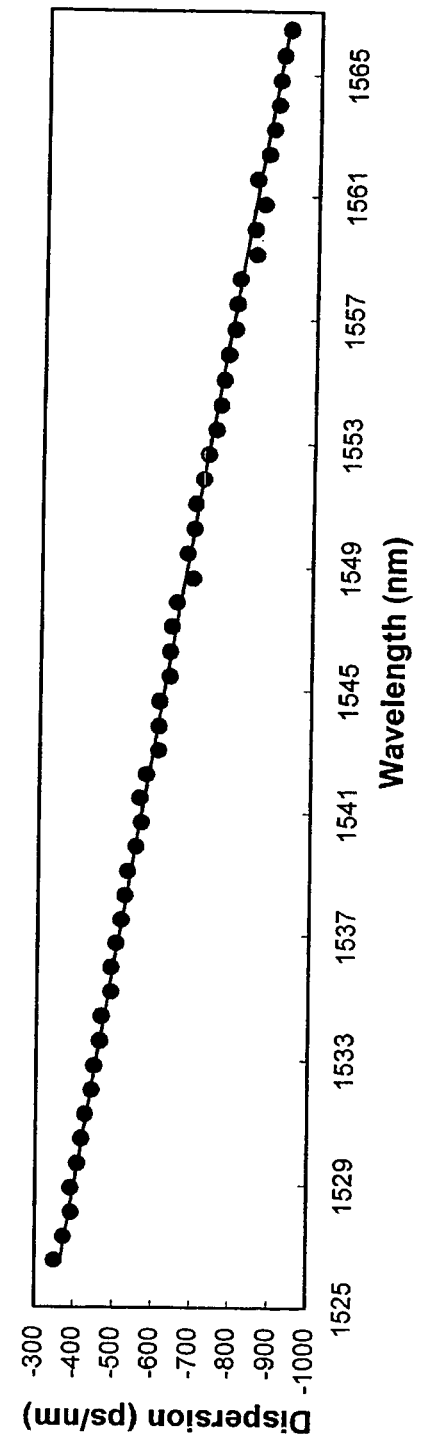

FIGS. 4A to 4D show experimental results obtained using a phase modulation acting as an apodization according to the present invention. A phase mask has been fabricated and was used to write an FBG having the reflectivity shown in FIG. 4A and the group delay spectrum shown in FIG. 4B. Ripples in the group delay spectrum are also shown in FIG. 4C. Finally, FIG. 4D shows the dispersion values for each channel (dots) obtained through a linear fit of the group delay spectrum over the channel passband, in comparison with the target (solid line).

Another mean for transferring apodization structures into phase is through the addition of side band gratings. Let's go back to the grating summation expressed by Equation (2). This complex target profile presents two difficulties, assuming that a complex phase mask is to be used. Firstly, the overall apodization profile Ana(z) contains fine structures. Secondly, the overall phase profile $\theta(z)$ may contain periodicities that will be difficult to encode into the phase mask if their spatial frequencies are close to the zeros of the transfer function expressed by Equation (6). To mitigate these two problems, it is possible to add some side band gratings. In this case, a modified index profile $\Delta n_{struct,\ mod}(Z)$ is obtained and is mathematically expressed by:

$$\Delta n_{struct,mod}(z) = \Delta n_{offset} + \Delta n_a(z) \cdot \exp(i\theta(z)) + \Delta n_s(z) \cdot \exp(i\theta_s(z)) \quad (11)$$

where the last term of the equation represent the side band gratings that could be added without affecting the optical properties within the spectral range of interest. Equation (11) can in turn be expressed in terms of modified overall apodization and phase profiles:

$$\Delta n_{struct,mod}(z) = \Delta n_{offset} + \Delta \tilde{n}_a(z) \cdot \exp(i\theta_r(z)). \quad (12)$$

If the side bands are properly chosen, the overall modified apodization profile $\Delta \tilde{n}_a(z)$ contains no fine structures and the modified overall phase profile $\theta_r(z)$ contains no problematic periodicities close to the zeros of the transfer function.

In order to ensure that the side bands change the optical properties of the optical grating only outside the spectral region of interest, it is useful to consider the Fourier spectrum of the target index profile given by Equation (2). Let $\Delta N_{struct}(f)$ be the Fourier spectrum of the target profile of the optical grating:

$$\Delta N_{struct}(f) = \Im\{\Delta n_{struct}(z)\}, \quad (13)$$

where $\Im$ is the Fourier operator.

It is found that $\Delta N_{struct}(f)$ is non zero only within a certain range of spatial frequencies (between $f_{min}$ and $f_{max}$). This range corresponds to the different sub-gratings of the multi-channel grating. The side bands to be added will not affect the optical properties of the optical grating within the spectral region of interest if their Fourier spectrum is zero within the range between $f_{min}$ and $f_{max}$.

The side bands are preferably found through the following iterative procedure:

1. $\Delta n_{struct,mod}(z) = \Delta n_{struct}(z);$      (14)

2. $\Delta n_{struct,mod}(z) = \Delta n_{offset} + \Delta n_m(z) \cdot \exp(i\theta_m(z));$      (15)

3. $\Im\{\theta_f(z)\} = \Im\{\theta_m(z)\} \cdot F(f);$      (16)

4. $\Delta n_{struct,mod}(z) = \Delta n_{offset} + \Delta \tilde{n}_a(z) \cdot \exp(i\theta_f(z));$      (17)

5. $\Delta N_{struct,mod}(f) = \Im\{\Delta n_{struct,mod}(z)\};$      (18)

6. $\Delta N_{hybrid}(f) = \Delta N_{struct,mod}(f_{min}\text{>}f\text{>}f_{max}) + \Delta N_{struct}$
   $(f_{min}\text{<}f\text{<}f_{max})$      (19)

7. $\Delta n_{struct,mod}(z) = \Im^{-1}\{\Delta N_{hybrid}(f)\};$      (20)

8. Go back to step 2.      (21)

In step 1, the modified index profile $\Delta n_{struct,mod}(z)$ is set equal to the target index profile of the multi-channel grating (without any side band).

In step 2, the modified index profile is expressed in term of modified overall apodization and phase profiles $\Delta n_m(z)$ and $\theta_m(z)$.

In step 3, a filtered phase profile $\theta_f(z)$ is obtained by filtering out the phase periodicities required to be minimized. The filter function F(f) can be equal to 1 except for the spatial frequencies where the phase periodicities are to be filtered out, where it is set to 0. The filtering can be more sophisticated and achieved to favor spatial frequencies that are far from the zeros of the mask-fiber transfer function. An appropriate weighting of the different components of the phase shift spectrum can be done to minimize the adverse effect of the mask-fiber transfer function. It is to be noted that the filtering is preferably applied to the phase shift profile (defined in Equation (7)) rather than on the overall phase profile, although for simplicity in the notation of Equation (16) it is written to be applied to the overall phase profile.

In step 4, the modified index profile is changed so that the modified overall apodization profile $\Delta n_m(z)$ is replaced by another overall apodization profile $\Delta \tilde{n}_a(z)$, and the modified overall phase profile $\theta_m(z)$ is replaced by the filtered phase profile $\theta_f(z)$. At this step, the modified index profile may have quite modified spectral characteristics, even within the spectral region of interest. The smooth apodization profile $\Delta \tilde{n}_a(z)$ can be predetermined at the onset of the iterative process. It can also be different for each iteration, for example by setting $\Delta \tilde{n}_a(z)$ to be equal to $\Delta n_m(Z)$ smoothed spatially.

In step 5, the Fourier spectrum of the modified index profile is calculated.

In step 6, a hybrid index profile is calculated by summing the Fourier spectrum of the modified index profile outside the range of interest with the Fourier spectrum of the target index profile within the range of interest. In other words, the hybrid grating index profile is the original one from which are added some side bands generated by step 4.

In step 7, the modified index profile is set equal to the hybrid index profile. At this step, the optical characteristics are the same than the target index profile within the spectral range of interest and include some side bands outside the spectral range of interest. Its apodization profile is not necessarily free of fine structures but has less such structures than the target index profile. In the same manner, it is not necessarily free of phase periodicities required to be filtered out but has less than the target index profile. This is why the procedure is repeated many times until the modified index profile is considered sufficiently free of fine-structured apodization and phase periodicities required to be filtered out. The smooth apodization profile $\Delta \tilde{n}_a(z)$ and the filter function F(f) are chosen such as permitting the convergence of the iterative process.

Figure 5A:
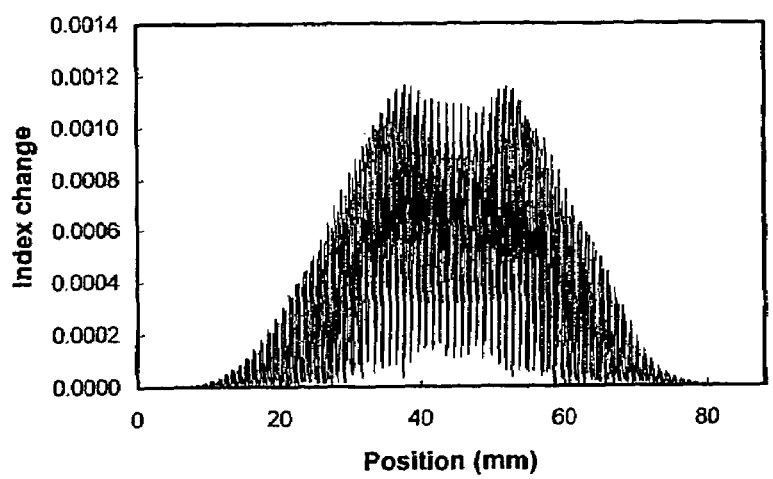
FIGS. 5A to 5G are similar graphs as those of FIGS. 1A to 1G, representing a 51-channel grating corresponding to the mathematical sum of corresponding sub-gratings.
Figure 5B:
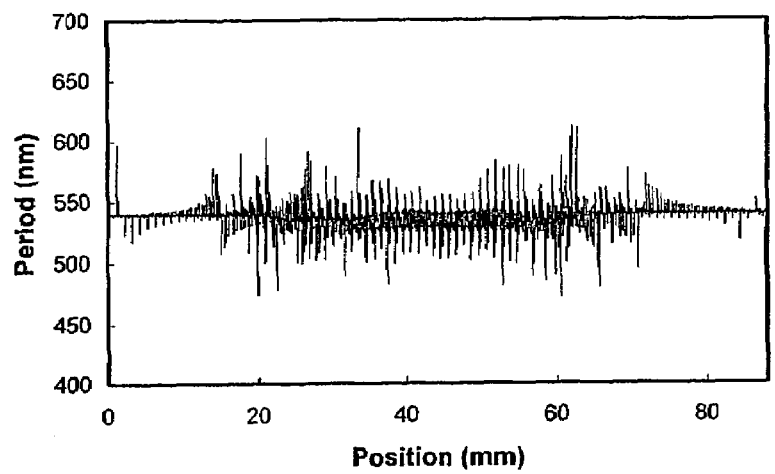
Figure 5C:
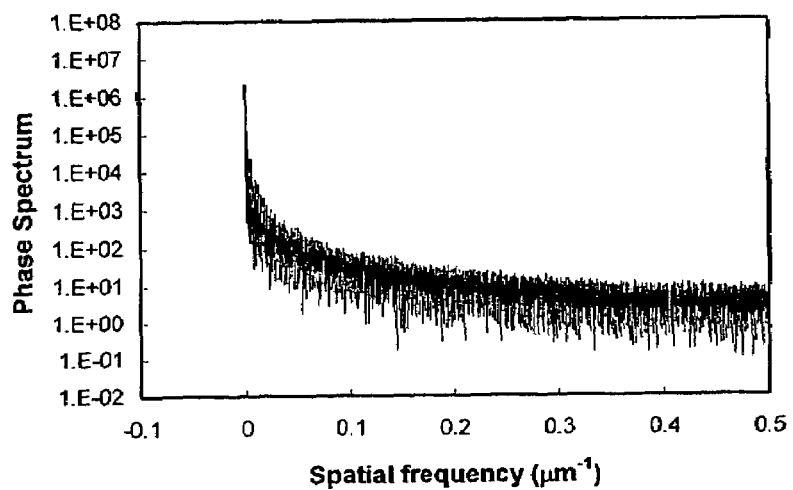
Figure 5D:
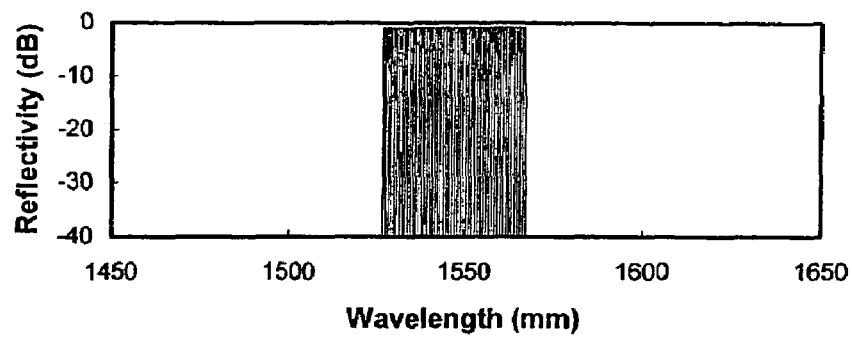
Figure 5E:
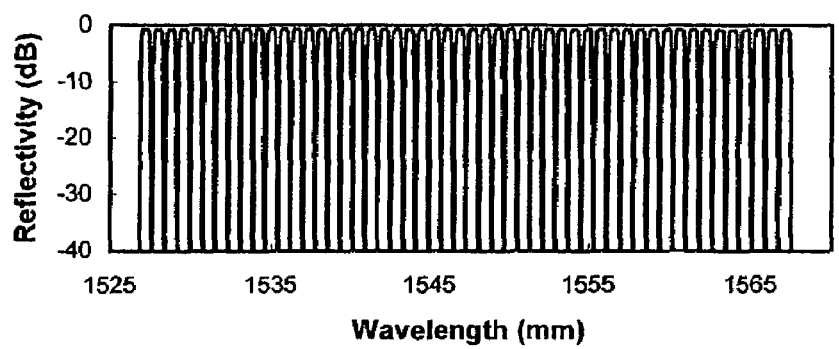
Figure 5F:
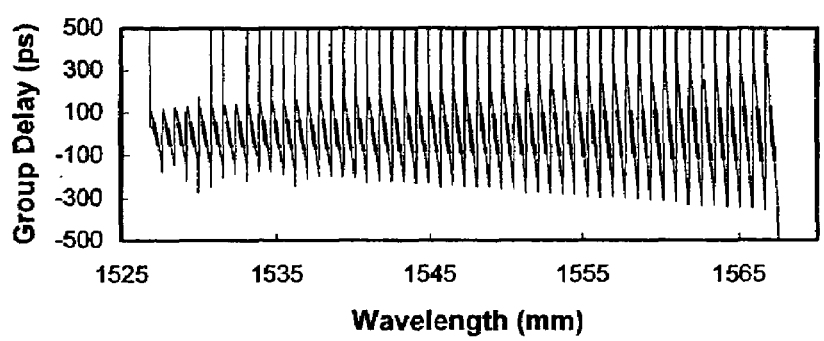
Figure 5G:
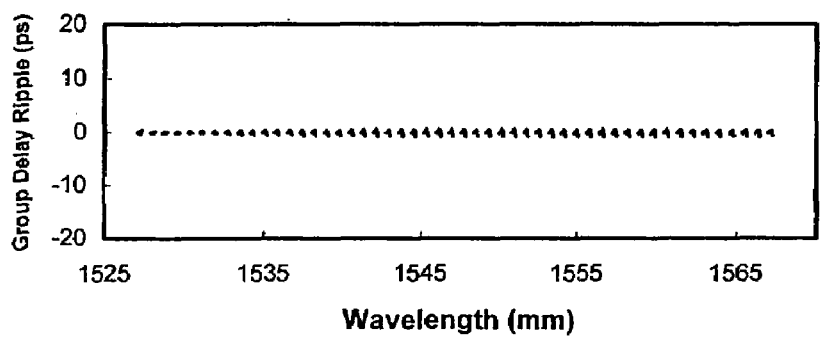

FIGS. 5A to 5G and 6A to 6G illustrate this technique for transferring apodization structures into phase through the addition of side band gratings. FIGS. 5A to 5G show the physical and spectral profiles of the initial grating, i.e., the target index profile obtained after summing the individual gratings, each associated with one of 51 channels. The apodization profile is shown in FIG. 5A where fine structures are clearly seen. Fine structures are also seen in the period profile shown in FIG. 5B. In FIG. 5C, it can be seen that the Fourier spectrum of the phase shift is spread over many frequencies including some that could be problematic due to the mask-fiber transfer function. In FIG. 5D, one can see that no side band is produced by the summing process, only the 51 required peaks appear, more clearly seen in FIG. 5E. Finally, FIGS. 5F and 5G show the group delay and group delay ripple spectra, respectively.

Figure 6A:
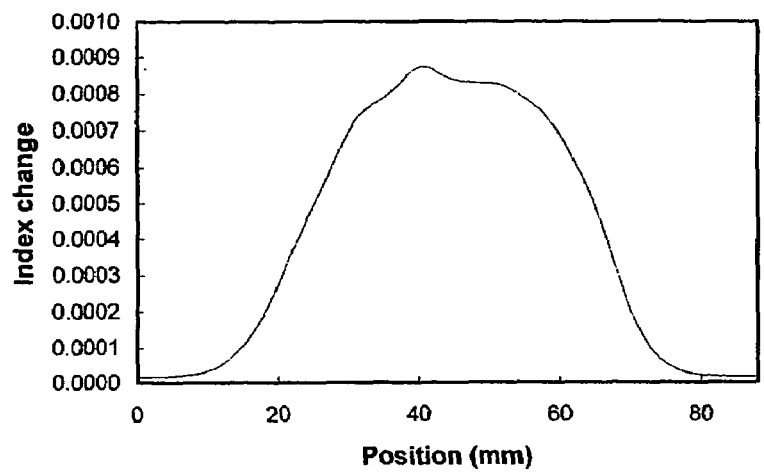
FIGS. 6A to 6G are similar graphs as those of FIGS. 1A to 1G for the 51-channel grating of FIGS. 5A to 5G after iteratively translating apodization features into side bands.
Figure 6B:
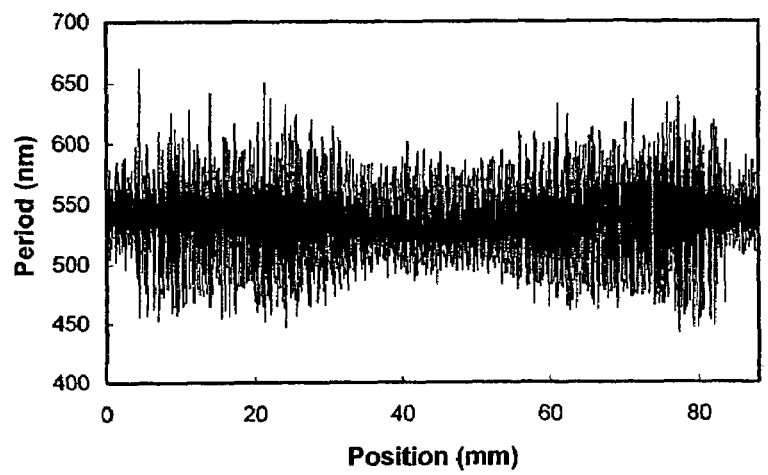
Figure 6C:
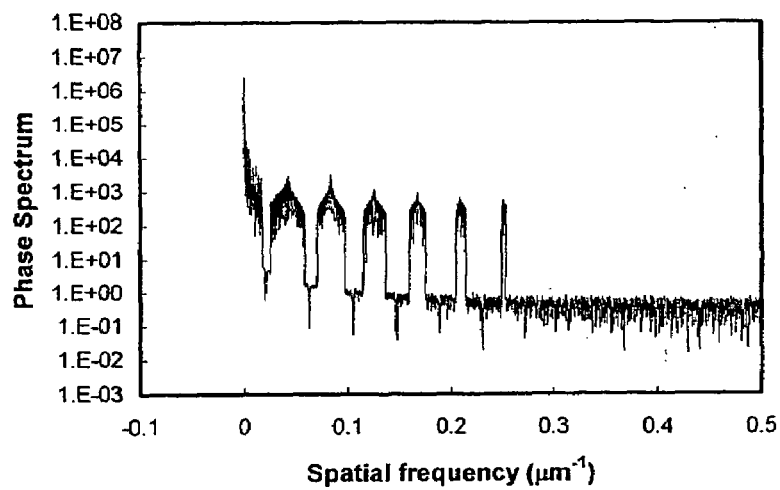
Figure 6D:
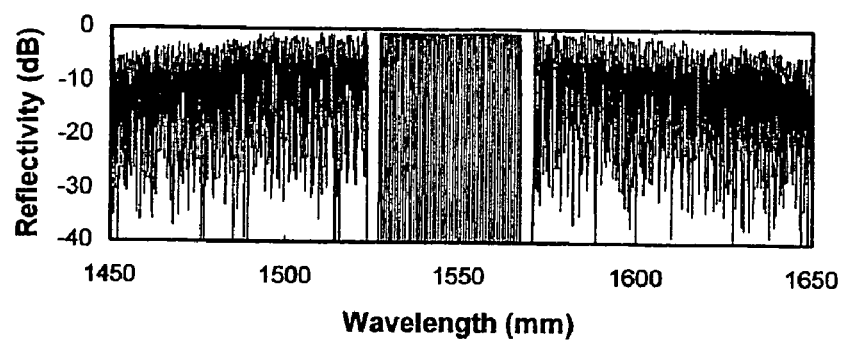
Figure 6E:
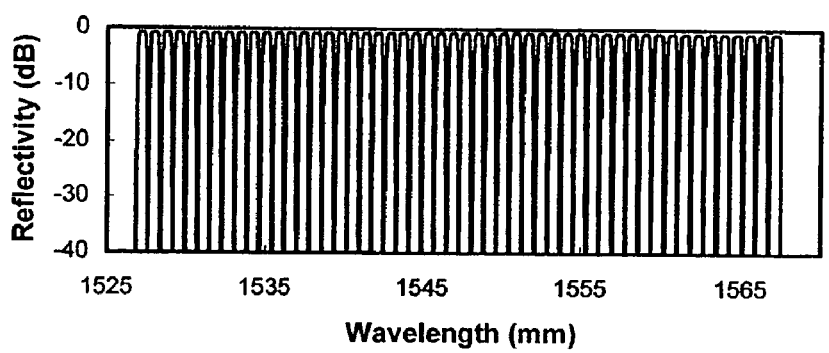
Figure 6F:
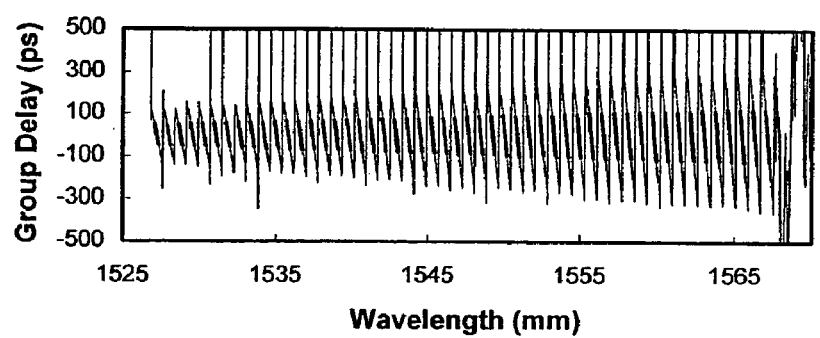
Figure 6G:
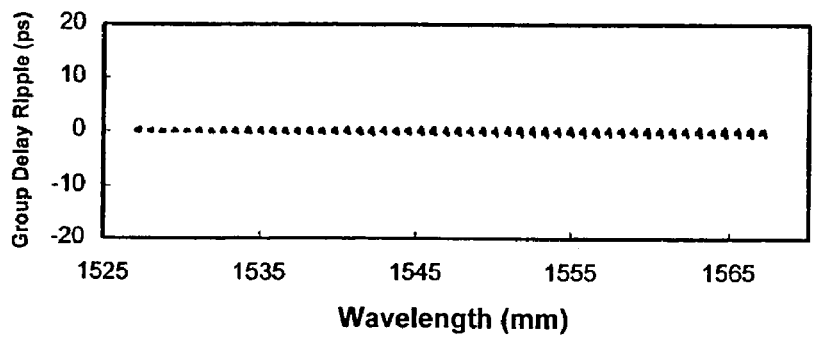
Figure 7A:
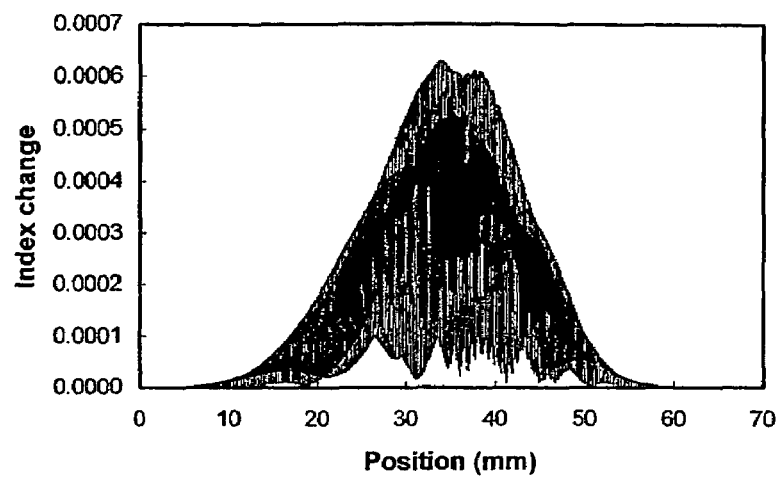
FIGS. 7A to 7G are similar graphs as those of FIGS. 1A to 1G, representing a 9-channel grating corresponding to the mathematical sum of corresponding sub-gratings.
Figure 7B:
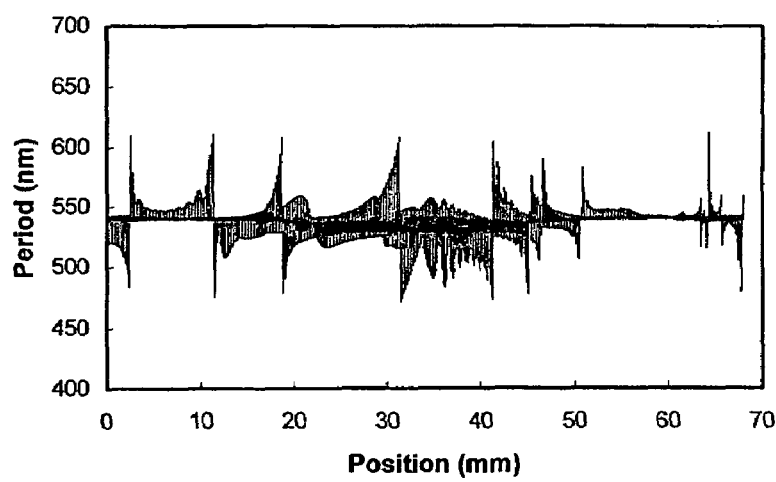
Figure 7C:
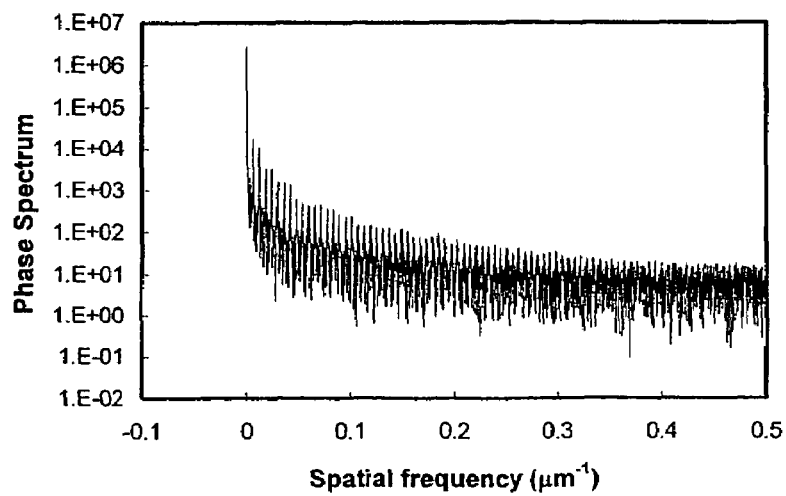
Figure 7D:
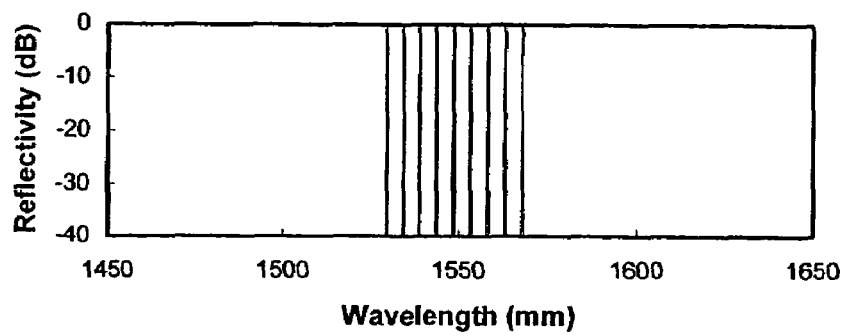
Figure 7E:
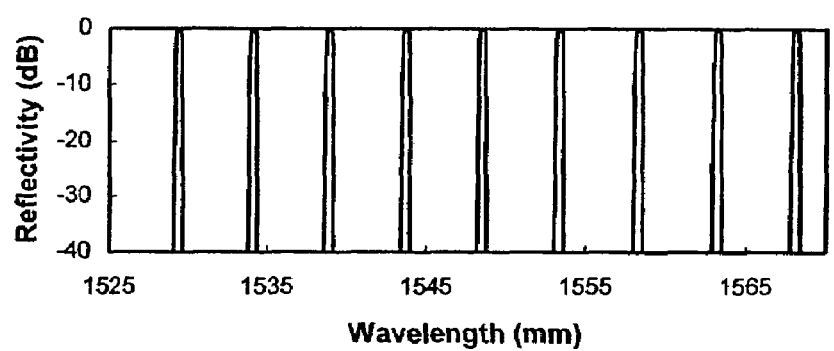
Figure 7F:
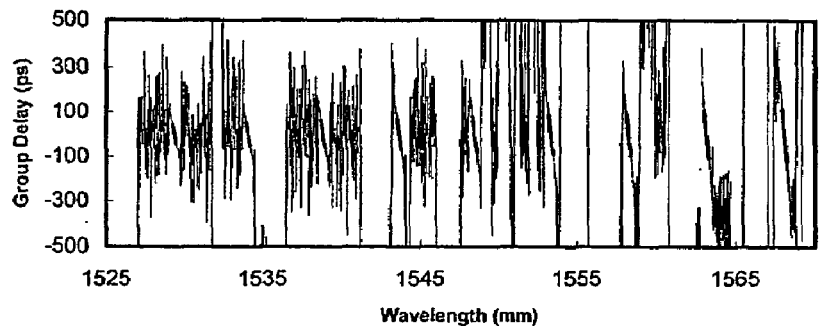
Figure 7G:
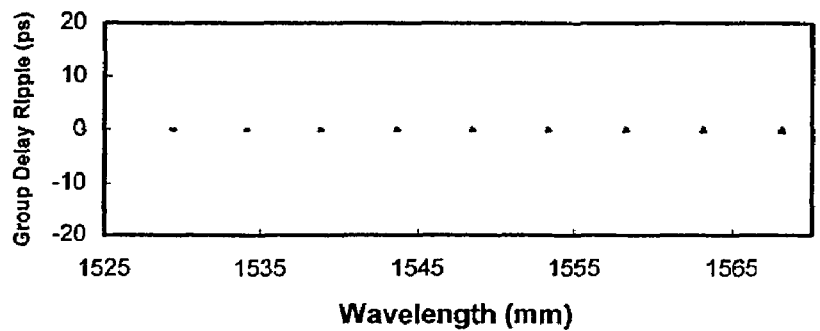
Figure 8A:
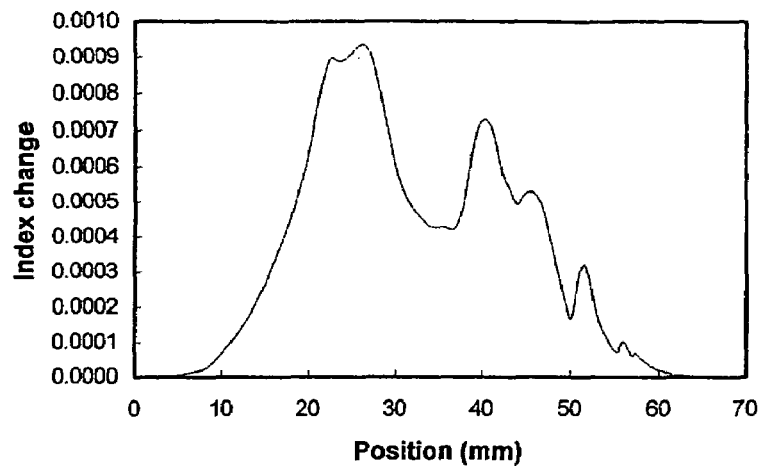
FIGS. 8A to 8G are similar graphs as those of FIGS. 1A to 1G for the 9-channel grating of FIGS. 7A to 7G after translating apodization features into phase through a non-uniform phase sampling approach.
Figure 8B:
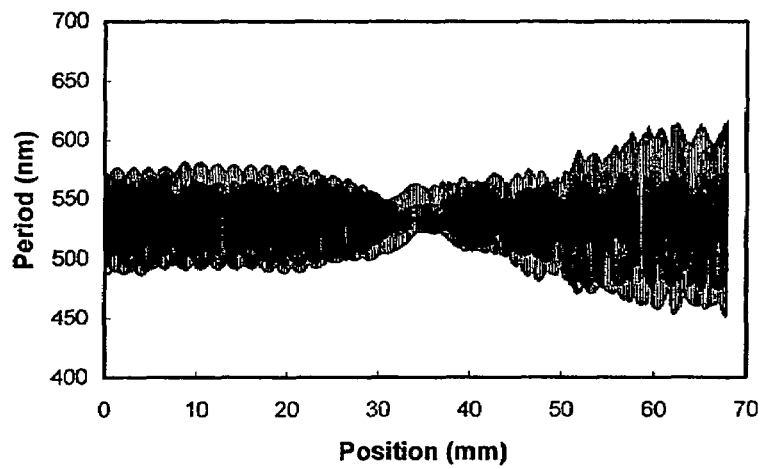
Figure 8C:
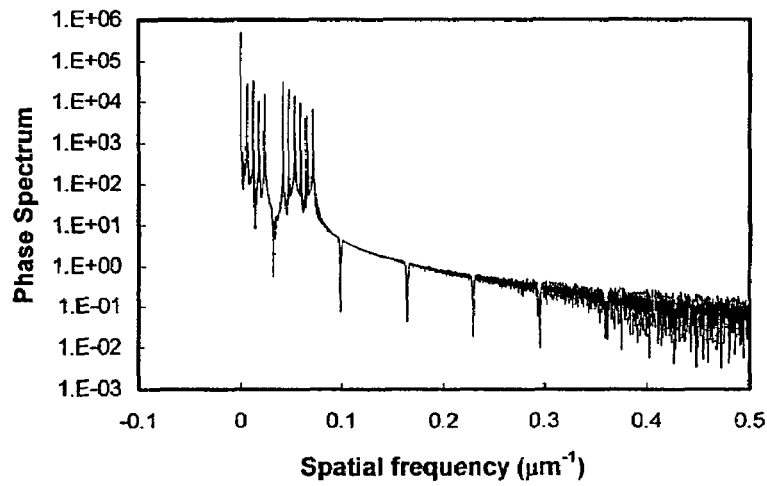
Figure 8D:
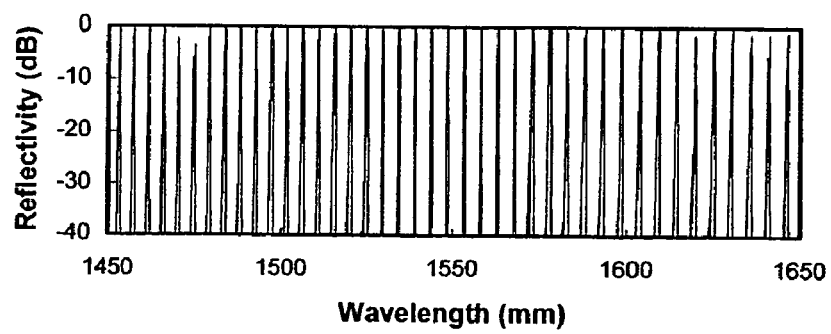
Figure 8E:
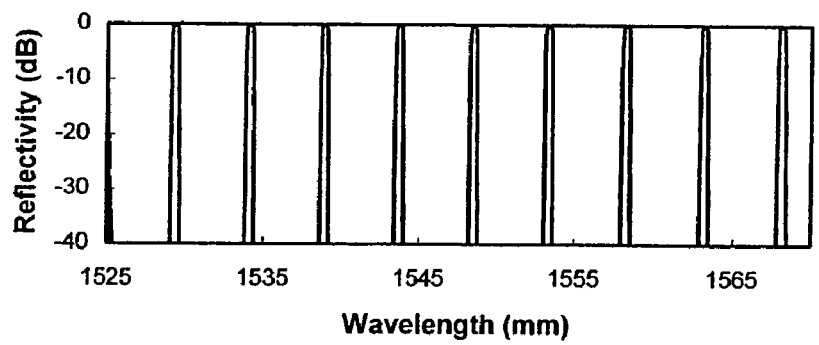
Figure 8F:
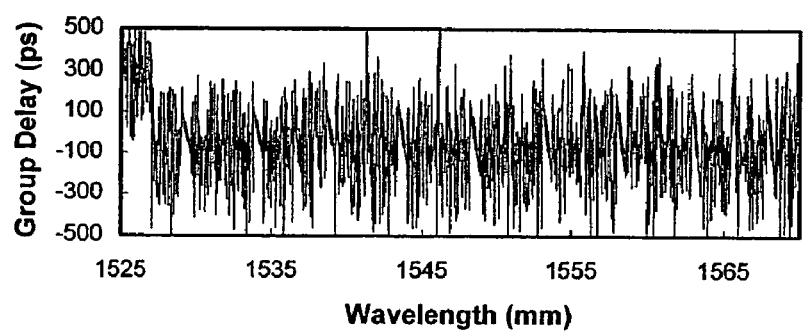
Figure 8G:
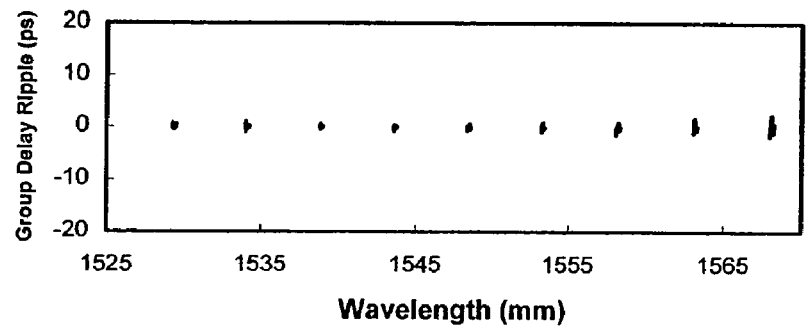

FIGS. 6A to 6G shows the same graphs after the iterative process is applied. It can be seen in FIG. 6A that a smooth apodization profile is obtained. In FIG. 6C, one can see that the spectrum of the phase profile was modified such as avoiding most of the components near the zeros of the mask-fiber transfer function occurring at spatial frequencies of 0.021, 0.063, 0.105, 0.147, 0.189, 0.231 and 0.273 $\mu m^{-1}$ in this case. Side bands are created by this process as can be seen in FIG. 6D, although not affecting the optical characteristics within the spectral region of interest as can be seen in FIGS. 6E, 6F and 6G.

Non-Uniform Phase-Sampling

The embodiments described above all aim at directly encoding the superposition of the individual sub-gratings in the phase mask. Another possible approach to put the present invention to practice is through a modified phase sampling approach.

As mentioned above, phase sampling is an advantageous technique for the mass production of FBGs. However, a main drawback of this technique is the lack of control on the optical characteristics of the individual channels of the produced grating. The present invention allows circumventing this inconvenient while still taking advantage of the useful aspects of phase sampling.

Before discussing how the present invention may be adapted to match this approach, a brief review of the principles behind the phase sampling technique is presented.

The standard phase sampling approach to generate a multi-channel grating can be summarized by the following two equations, i.e.

$$\Delta n(z) = \underbrace{\Delta n_0(z) \exp\left[j\left(\frac{2\pi}{\Lambda_0} z + \Delta\theta_0(z)\right)\right]}_{\text{Seed grating}} \times \underbrace{\exp(j\theta_s(z))}_{\text{Phase sampling}}, \quad (22)$$

where $$\theta_s(z) = \sum_m A_m \cos(2\pi m z / \Lambda_s) + B_m \sin(2\pi m z / \Lambda_s). \quad (23)$$

The index modulation $\Delta n(z)$ is thus given by the product of the index modulation of a seed grating multiplied by a phase sampling function. The amplitude of the index modulation of the seed grating, i.e. the apodization profile of the grating, is described by function $\Delta n_0(z)$. The basic period $\Lambda_0$ of the seed grating determines the central wavelength $\lambda_0$ reflected thereby, i.e.

$$\lambda_0 = 2 n_{\textit{eff}} \Lambda_0, \quad (24)$$

where $n_{\textit{eff}}$ is the effective index of the fundamental mode in the optical fiber. The phase shift function $\Delta\theta_0(z)$ is used to describe any variation in the local period of the seed grating. For example, it can be used to represent a linear variation in the local period as found in chirped gratings used for dispersion compensation.

The sampling function has a phase $\theta_s(z)$ that varies periodically with a basic period $\Lambda_s$. As shown in Equation (23), the phase can be represented by a Fourier series, where $A_m$ and $B_m$ are real coefficients. The complex sampling function is itself a periodical function that can be written as a complex Fourier series, i.e.

$$\exp(j\theta_s(z)) = \sum_{n=-\infty}^{\infty} |C_n| \exp[j\phi_n] \exp\left(j\frac{2\pi n}{\Lambda_s} z\right), \quad (25)$$

where $|C_n|$ and $\phi_n$ are the amplitude and phase of the $n^{th}$ complex harmonic. Inserting (25) into (22) leads to $$\Delta n(z) = \sum_{n=-\infty}^{\infty} |C_n| \Delta n_0(z) \exp\left[j\left(2\pi\left(\frac{1}{\Lambda_0} + \frac{n}{\Lambda_s}\right) z + \Delta\theta_0(z) + \phi_n\right)\right]. \quad (26)$$

The phase sampled grating thus corresponds to the superposition of an infinite number of gratings, all with the same apodization profile $\Delta n_0(z)$ and phase shift profile $\Delta\theta_0(z)$. The amplitude of grating n is determined by the amplitude of the Fourier coefficients $|C_n|$, whereas its basic period $\Lambda_n$ is equal to $$\Lambda_n = \left(\frac{1}{\Lambda_0} + \frac{n}{\Lambda_s}\right)^{-1}. \quad (27)$$

As a result, the phase sampled grating has a spectral response comprising an infinite number of identical channels that are equidistant in optical frequency but differ in reflectivity due to the different amplitudes $|C_n|$. For example, if the seed grating is a chirped grating designed for dispersion compensation, all channels reflected by the phase sampled grating will have the same dispersion. A constant phase angle $\theta_n$ is also added to each grating, but has little importance in practice. Finally, it can be shown that $$\sum_{n=-\infty}^{\infty} |C_n|^2 = 1. \quad (28)$$

The design of a phase sampled grating thus proceeds as follows. The sampling period $\Lambda_s$ is chosen in order to obtain the desired optical frequency spacing between the channels. The Fourier coefficients $A_m$ and $B_m$ appearing in Equation (23) are determined by a numerical optimization procedure to match the target channel spectrum. Typically, the target spectrum may consist of $N_c$ equidistant channels of equal strength. The optimization procedure is then carried out to obtain a Fourier series (25) with $N_c$ coefficients $|C_n|$ that are as uniform as possible. The optimization procedure also aims at maximizing the efficiency of the sampling, defined as $$\text{efficiency} = \sum_{n \in n_{channels}} |C_n|^2, \quad (29)$$

where the summation is now performed over the individual target gratings, in order to ensure that most of the grating reflectivity contributes to useful channels. Typical achievable efficiencies can be larger than 80%. When the target spectrum comprises $N_c$ channels of equal strength, the amplitude of the useful coefficient scales as $$|C_n| \approx \sqrt{\text{efficiency}/N_c}. \quad (30)$$

As aforementioned, the constant phase angles $\phi_n$ have no practical impact on the spectral response of the multi-channel grating and are left as free parameters during the optimization procedure.

The phase sampling function determines how the overall index modulation is split among individual gratings. The spectral response of each individual grating, i.e. the shape of each channel constituting the reflectivity spectrum of the multi-channel grating, is determined by the apodization and phase profiles of the seed grating. These are designed using a procedure such as inverse scattering, whereas the basic period $\Lambda_0$ is chosen to align spectrally the designed channels to the target channels. Typically, this is done by aligning the spectral response of the seed grating with one of the target channels. Finally, the amplitude of the seed grating apodization profile $\Delta n_0(z)$ is adjusted so that each individual grating has an index modulation of the correct amplitude, taking into account the efficiency of the phase sampling.

Phase sampling thus offers major advantages:
- The multi-channel character of the grating can be encoded into a phase mask, which eases fabrication considerably.
- It is known that diffraction taking place between the phase mask and the optical fiber can impede the transfer of longitudinal structures of given periods. When designing the sampling phase function $\theta_s(z)$, one can choose from the start only those harmonics with periods $\Lambda_s/m$ that are well transferred for a given distance between the mask and the fiber. This reduces the sensitivity of the writing procedure to positioning errors of the fiber relative to the phase mask. Moreover, the effect of diffraction can be easily compensated for by adjusting the coefficients $A_m$ and $B_m$ describing the phase sampling function in the phase mask.

The required apodization profile corresponds to that of the seed grating, and is usually a smooth and slowly varying function of position that can be easily realized with usual methods.

The required amplitude of the index modulation scales as the square root of the number of target channels, rather than as the number of channels. Less index change is thus required to produce a number of channels with a given reflectivity.

According to the above description, conventional phase sampling leads to a multi-channel grating that reflects identical channels. For example, a multi-channel dispersion compensator based on phase sampling produces spectral channels that all have the same dispersion. Chirping the sampling period allows getting channels with different dispersion levels. Mathematically, this operation is performed by replacing z by $z-\beta_s z^2/2$ in the expression of an existing phase sampling function, i.e.

$$\exp(j\theta_s(z)) = \sum_{n=-\infty}^{\infty} |C_n|\exp(j\phi_n)\exp\left[j\frac{2\pi n}{\Lambda_s}(z-\beta_s z^2/2)\right]. \qquad (31)$$

The overall index modulation then becomes $$\Delta n(z) = \qquad (32)$$

$$\sum_{n=-\infty}^{\infty} |C_n|\Delta n_0(z)\exp\left[j\left(2\pi\left(\frac{1}{\Lambda_0}+\frac{n}{\Lambda_s}\right)z - \frac{\pi n \beta_s}{\Lambda_s}z^2 + \Delta\theta_0(z) + \phi_n\right)\right].$$

A quadratic phase term is thus added to each individual grating, which amounts to chirping the period profile of each grating. This approach offers a limited flexibility. The quadratic phase coefficient varies in a predetermined fashion, i.e. linearly with index m. This, in turn, determines the achievable functional variation of the dispersion from channel to channel. Secondly, all individual gratings still have the same apodization profile $\Delta n_0(z)$. In other words, all individual gratings have the same length. This, coupled to the fact that the gratings have different chirps, results in a variation of the reflectivity bandwidth from grating to grating.

One embodiment of the present invention aims at addressing these limitations and providing a phase-sampled multichannel grating capable of producing a spectral response composed of multiple channels of arbitrary shape.

According to the present embodiment of the invention, the target index profile of the desired multi-channel grating is first based on the combination of the profiles of each individually designed sub-grating, each sub-grating being associated with a channel. The target index profile may be expressed as $$\Delta n(z) = \sum_k \Delta n_k(z)\exp\left[j\left(2\pi\left(\frac{1}{\Lambda_0}+\frac{k}{\Lambda_s}\right)z + \Delta\theta_k(z) + \phi_k\right)\right]. \qquad (33)$$

The apodization and phase shift profiles of the sub-grating identified by index k are given by $\Delta n_k(z)$ and $\Delta\theta_k(z)$, whilst the basic period of this sub-grating is equal to $$\Lambda_k = \left(\frac{1}{\Lambda_0}+\frac{k}{\Lambda_s}\right)^{-1}. \qquad (34)$$

Both the apodization and phase profiles can vary from sub-grating to sub-grating. The individual sub-gratings can thus reflect spectral channels with different optical characteristics, such as reflectivity, dispersion and dispersion slope. The constant phase angles $\phi_k$ have no practical impact on the spectral response of the multi-channel grating, but will serve as adjustable parameters during the design of the grating. The target index profile can thus be rewritten as $$\Delta n(z) = \underbrace{\Delta n_0(z)\exp\left[j\left(\frac{2\pi}{\Lambda_0}z + \Delta\theta_0(z)\right)\right]}_{\text{Seed grating}} \underbrace{\sum_k C_k(z)\exp\left[j\frac{2\pi k}{\Lambda_s}z\right]}_{\text{Target sampling function}}. \qquad (35)$$

where $$C_k(z) = \frac{\Delta n_k(z)}{\Delta n_0(z)}\exp(j(\delta\theta_k(z)+\phi_k)) \qquad (36)$$

and $$\delta\theta_k(z) = \Delta\theta_k(z) - \Delta\theta_0(z). \qquad (37)$$

The target index profile has been rewritten as a seed grating multiplied by a target sampling function. This formulation is reminiscent of that applicable to a standard phase sampled grating, but differs in some important ways.

In the present instance, the complex coefficients $C_k$ of the harmonics composing the target sampling function vary with position z, as indicated in equations (36) and (37). A modified target index function is obtained by realizing the target sampling function as accurately as possible with a phase function, i.e.

$$\exp(j\theta_s(z)) \approx \sum_k C_k(z)\exp\left[j\frac{2\pi k}{\Lambda_s}z\right], \qquad (38)$$

where $$\theta_s(z) = \sum_m A_m(z)\cos(2\pi mz/\Lambda_s) + B_m(z)\sin(2\pi mz/\Lambda_s). \qquad (39)$$

The sampling phase $\theta_s(z)$ has again been decomposed as a Fourier series, but with spatially varying coefficients $A_m(z)$ and $B_m(z)$ in order to account for the spatial variation of coefficients $C_k(z)$. The optimization of the sampling phase coefficients $A_m$ and $B_m$ must thus be performed at each point along the grating.

As indicated in Equations (38) and (39), the target coefficients $C_k(z)$ are characterized by an amplitude profile $|C_k(z)|$ but also by a phase profile $\delta\theta_k(z)$. At each point along the grating, the optimization procedure must thus aim at reproducing the relative amplitudes as well as the relative phases of these coefficients. This added complexity is required to obtain, for example, individual spectral responses for different channels providing different dispersion levels.

An example of a design procedure is now presented for illustrative purposes. It assumes the center of the multi-channel grating to stand at z=0. At this point, the sub-gratings are characterized by index modulation amplitudes $\Delta n_k(0)$. The sampling phase coefficients $A_m(0)$ and $B_m(0)$ are then optimized numerically to ensure a match between the relative amplitudes of coefficients $C_k(0)$ and the relative amplitudes of $\Delta n_k(0)$, while maximizing the sampling efficiency as described above. This design step also determines the relative phases of the individual sub-gratings at z=0, i.e. it determines the values of constant phase angles $\phi_k$. Since the spatial phase profile of each target sub-grating is also predetermined, this first design step determines the relative phases of the individual sub-gratings at all positions z. A second design step is then performed at position z=$\Delta$z. In this case, the sampling phase coefficients $A_m(\Delta z)$ and $B_m(\Delta z)$ are optimized numerically to ensure a match between the relative amplitudes of coefficients $C_k(\Delta z)$ and the relative amplitudes of $\Delta n_k(\Delta z)$ while maintaining a high sampling efficiency, but also to ensure a match between the relative phases of coefficients $C_k(\Delta z)$ and the relative phases of the sub-gratings at this position. This design step is repeated at all positions along the grating.

Up to now, the design procedure has provided a set of coefficients $A_m(z)$ and $B_m(z)$ that ensure at each position z a match between the relative amplitudes and phases of the sub-gratings generated by the sampling function and those of the target sub-gratings. Following this, the amplitude profile $\Delta n_0(z)$ of the seed grating is adjusted to ensure a match between the absolute value of the index modulation amplitude of each sub-grating generated by the phase sampling and the index modulation amplitude $\Delta n_k(z)$ for each target sub-grating, taking into account the sampling efficiency previously achieved at each point along the grating. Likewise, the phase shift $\Delta\theta_o(z)$ of the seed grating is adjusted to ensure a match between the absolute phase of each sub-grating generated by the phase sampling and the absolute phase of each target sub-grating, taking into account the constant phase angles $\phi_k$.

Notwithstanding the specific design procedure used to calculate the sampling phase coefficients $A_m(z)$ and $B_m(z)$, the formulation (35)-(39) allows generalizing the phase sampling approach to multi-channel gratings reflecting dissimilar spectral channels. This approach affords all the advantages of the standard phase sampling approach discussed above. This formulation makes sense as long as the sampling phase coefficients $A_m(z)$ and $B_m(z)$ do not vary too much over a sampling period $\Lambda s$.

FIGS. 7A to 7G and 8A to 8G illustrate the above explained embodiment of using a modified phase sampling approach to obtain a modified index grating encodable in a phase mask. FIGS. 7A to 7G are similar graphs as those of FIGS. 1A to 1G, representing a 9-channel grating corresponding to the mathematical sum of corresponding sub-gratings and FIGS. 8A to 8G are similar graphs as those of FIGS. 1A to 1G for the 9-channel grating of FIGS. 7A to 7G after translating apodization features into phase through a non-uniform phase sampling approach.

Exemplary Embodiment of Photoinducing the Optical Grating

The last step of the method according to a preferred embodiment of the present invention, after the phase mask has been properly encoded with the target grating, is to proceed with the actual photoinducing of the grating in the photosensitive medium.

Figure 9A:
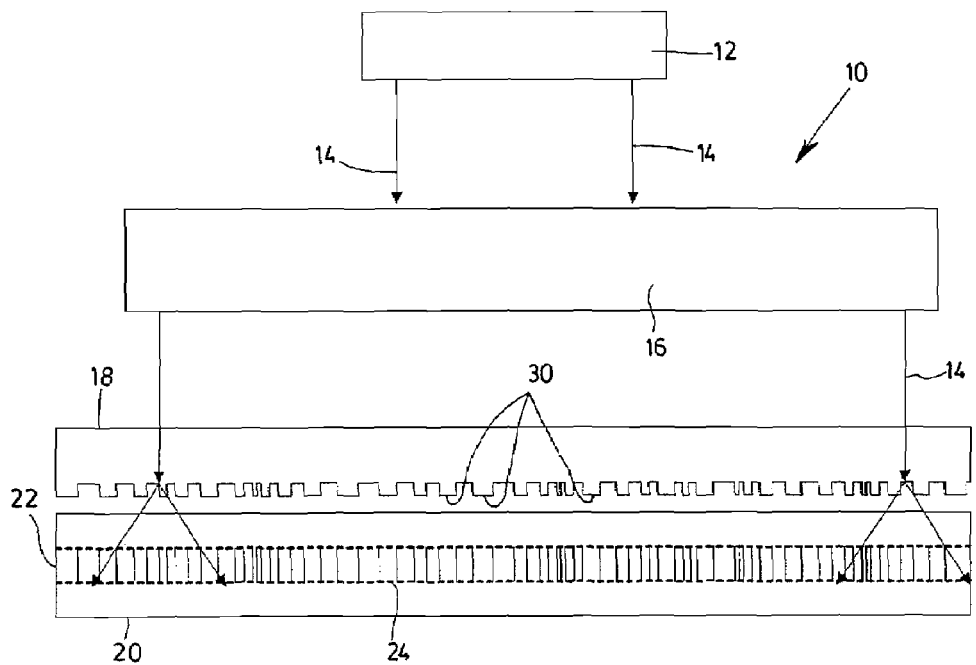
FIGS. 9A and 9B are schematic illustrations of two variants of a system for photoinducing an optical grating in a photosensitive medium, each including a phase mask according to one aspect of the invention.

Referring to FIG. 9A, there is shown a first example of an optical system 10 which may be used in this context. It first includes a writing laser 12 providing actinide radiation, preferably a UV light beam 14. Optionally, the UV light beam 14 may be shaped by appropriate shaping optics 16 as is well known to those skilled in the art. The light beam 14 impinges transversally on the back of the phase mask 18. In the present case, the light beam 14 is expended so as to have a width spanning the length of the phase mask 18. The phase mask 18 diffracts the radiation from the UV light beam into bright and dark fringes in a pattern corresponding to the target index profile, and the diffracted light impinges on the photosensitive medium which is disposed along the phase mask 18 in close proximity thereto. In the illustrated embodiment, the photosensitive medium is a length of optical fiber 20. The diffracted light photoinduces a refractive index modulation corresponding to the target profile in the core 22 of the optical fiber 20, this modulation defining the optical grating 24 after post-processing of the fiber as is well known in the art.

Figure 9B:
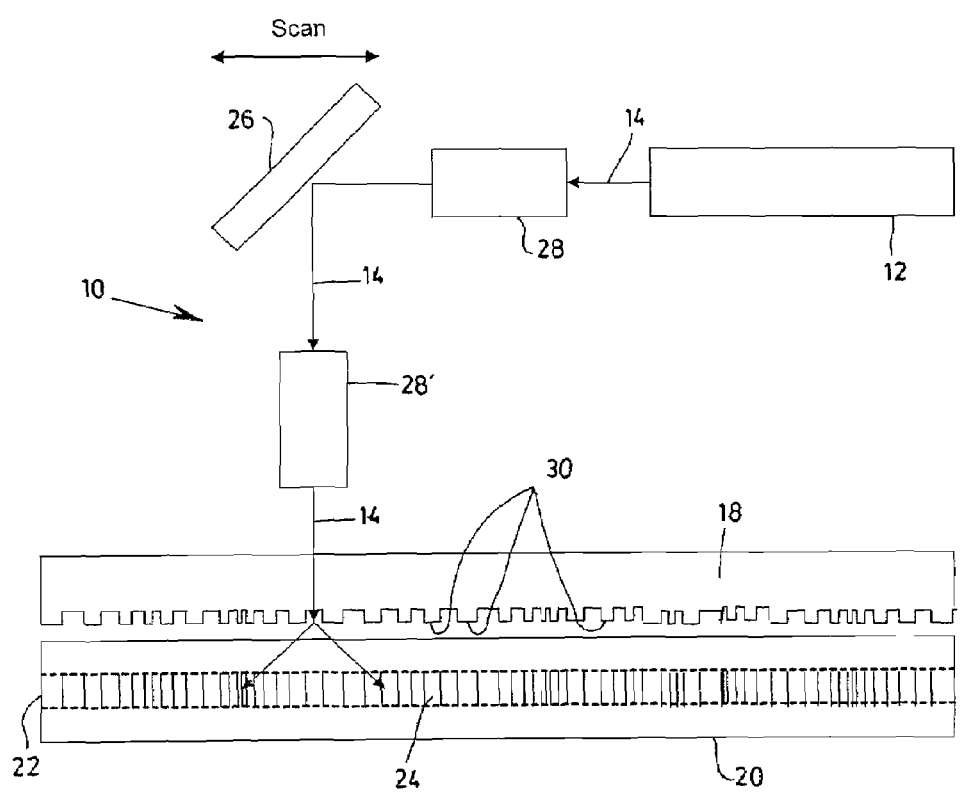

Referring to FIG. 9B, there is shown a system 10 according to an alternate embodiment. The system differ from the set up of FIG. 9A in that the UV light beam is scanned along the length of the phase mask instead of expanded for exposure of the entire phase mask. The system 10 is therefore provided with a scanning assembly including a moving mirror 26 and appropriate shaping optics 28 and 28' upstream and downstream thereof, respectively.

The systems of both FIGS. 9A and 9B include a phase mask 18 according to an aspect of the present invention. The phase mask 18 includes a plurality of grating corrugations 30 having a periodical spatial distribution. As explained above, the spatial distribution of the grating corrugations is encoded according to a target index profile of the multi-channel grating, modified so as to have a smooth apodization profile. The target index profile is based on the combination of index profiles of a plurality of sub-gratings, the index profile of each sub-grating being selected to provide the individual spectral response of a corresponding one of the channels. Preferably, The index profile of each sub-grating is such that the individual spectral response of the corresponding channel has a specific bandwidth, spacing, dispersion value and/or dispersion slope.

In one embodiment, the modified index profile of the multi-channel grating is defined by a phase-only translation of an overall apodization profile and an overall phase profile of the target index profile, both dependent on individual phase and apodization profiles of the sub-gratings. Alternatively, the target index profile of the multi-channel grating is defined by a seed grating multiplied by a sampling function, the sampling function having amplitude coefficients varying with z. The target sampling function is preferably represented as a phase-only sampling function which has a sampling phase decomposed as a Fourier series having spatially varying Fourier coefficients, these Fourier coefficients being numerically optimized for each position along the optical axis of the multi-channel grating.

The spatial distribution profile of the phase mask corrugations is preferably related to the modified index profile through a transfer function given by:

$$S(f) = S_m(f) \cdot 2 \cos(\pi f \Delta z),$$

where $S_m(f)$ and $S(f)$ are Fourier spectra of a phase shift profile of the phase mask and of the modified index profile of the multi-channel grating, respectively, f is a spatial frequency and $\Delta z$ is a distance between two points along the phase mask from which pass two beams interfering at a position z.

It will be noted that the encoding of the modified index profile into the phase mask and the photoinducing of the multi-channel grating in the photosensitive medium is not limited to the embodiments described above and may be performed by any other appropriate technique. For example, the multiple phase mask lines method, taught in U.S. Pat. No. 6,751,381 (POPELEK et al), could be used. In this last technique, at least two adjacent gratings are written side by side within the core of the fiber. A local apodization is obtained by controlling the local relative phase between the adjacent gratings. As another example, the in-mask encoding of the apodization profile could also be obtained by locally adjusting the diffraction efficiency through a control of the depth of the grooves (see F. Trépanier, M. Poulin, and G. Bilodeau, "Complex apodized holographic phase mask for FBG writing", Proc. of BGPP 03, paper WC5, (2003)).

In summary, the present invention allows to design a complex grating structure by the combination of individual and independently designed sub-grating, and the modification of the obtained target index profile to make it more "encodable" in a phase mask.

Using such a method provides a great versatility in the design of the optical characteristics of the grating, as the dependency of the spectral response of one grating on the response of another is removed. Advantageously, each channel may be designed to have a specific dispersion value and dispersion slope. This is achieved while still beneficiating from the convenience and repeatability of using a phase mask having all the necessary information encoded therein, which makes the present invention particularly adapted to mass production.

In one embodiment, the result of this design is represented as a structure having complex apodization and phase profiles with possibly fine longitudinal features. In order for this complex structure to be physically realizable, at least the fine longitudinal features of the period and apodization profiles are encoded into the phase mask. This encoding of the apodization profile can for example be performed through a phase modulation approach, or by adding appropriate side bands.

In another embodiment, the target profile is re-arranged as the product of a seed grating and a target sampling function. It can therefore be encoded in the phase mask by adapting standard phase sampling techniques.

Numerous modifications could be made to the embodiments above without departing from the scope of the present invention as defined in the appended claims.

The invention claimed is:

1. A method for manufacturing a multi-channel optical grating in a photosensitive medium, each channel of said multi-channel grating having an individual spectral response, said method comprising the steps of:
   a) for each channel, individually designing an index profile of a sub-grating providing the corresponding individual spectral response, each of said index profiles comprising an individual apodization profile and an individual phase profile of the corresponding sub-grating;
   b) determining a target index profile $\Delta n_{struct}(z)$ of the multi-channel grating based on a combination of the index profiles of said sub-gratings such that:

$$\Delta n_{struct}(z) = \Delta n_{offset} + \sum_k \Delta n_k(z) e^{i(\theta_k(z) + \phi_k)}$$

where z is an optical axis of said multi-channel grating, k is an indicia representing said sub-gratings, $\Delta n_k(z)$ and $\theta_k(z)$ are respectively the individual apodization and phase profiles of each sub-grating, $\phi_k$ is a relative phases between the sub-gratings and $\Delta n_{offset}$ is an index offset selected to make the target index profile strictly positive, said target index profile defining a target spectral response of said optical grating;
   c) determining a modified index profile having a smooth apodization profile and providing said target spectral response at least within a spectral region of interest;
   d) encoding a phase mask according to said modified index profile; and
   e) photoinducing said multi-channel grating in the photosensitive medium using said phase mask.

2. The method according to claim 1, wherein step a) comprises designing each of said sub-gratings so that the individual spectral response of the corresponding channel has a specific dispersion value.

3. The method according to claim 1, wherein step a) comprises designing each of said sub-gratings so that the individual spectral response of the corresponding channel has a specific dispersion slope.

4. The method according to claim 1, wherein step a) comprises designing each of said sub-gratings so that the individual spectral response of the corresponding channel has a specific bandwidth.

5. The method according to claim 4, wherein the specific bandwidths of the individual spectral response of all of said sub-gratings are the same.

6. The method according to claim 1, wherein step b) further comprises determining an overall apodization profile and an overall phase profile of said multi-channel grating, both being dependent on said individual phase and apodization profiles of the sub-gratings.

7. The method according to claim 6, wherein said overall apodization profile and overall phase profile of said multi-channel grating are respectively obtained from:

$$\Delta n_a(z) = |\Delta n_{struct}(z) - \Delta n_{offset}|, \text{ and}$$

$$\theta(z) = \tan^{-1}\left(\frac{\text{imag}(\Delta n_{struct}(z) - \Delta n_{offset})}{\text{real}(\Delta n_{struct}(z) - \Delta n_{offset})}\right).$$

8. The method according to claim 6, wherein the determining of the modified index profile of step c) comprises:
   replacing said overall apodization profile of the target index profile by said smooth apodization profile; and
   translating fine structures of said overall apodization profile into said overall phase profile.

9. The method according to claim 8, wherein said smooth apodization profile is uniform.

10. The method according to claim 8, wherein said smooth apodization profile varies smoothly along an optical axis of said multi-channel grating.

11. The method according to claim 8, wherein said translating further comprises including a phase apodization component in said modified index profile, and adjusting said phase apodization component to provide the target spectral response of the optical grating within the spectral region of interest while generating reflection features outside of the spectral region of interest.

12. The method according to claim 8, wherein said translating comprises:
   adding index profiles of side band sub-gratings to said modified index profile, each of said side band sub-gratings having a spectral response in a side band outside of the spectral region of interest of said multi-channel optical grating; and
   iteratively adjusting the modified index profile so as to transfer said fine structures of said overall apodization profile to said side bands.

13. The method according to claim 12, wherein said iteratively adjusting further transfers undesired features of the overall phase profile to said side bands.

14. The method according to claim 8, wherein the encoding of step d) comprises modulating a phase of corrugations along said phase mask according to said overall phase profile.

15. A method for manufacturing a multi-channel optical grating in a photosensitive medium, each channel of said multi-channel grating having an individual spectral response, said method comprising the steps of:
   a) for each channel, individually designing an index profile of a sub-grating providing the corresponding individual spectral response;
   b) determining a target index profile of the multi-channel grating based on a combination of the index profiles of said sub-gratings such that it corresponds to a seed grating multiplied by a sampling function, said sampling function being represented by:

$$\sum_k C_k(z) \exp\left[j \frac{2\pi k}{\Lambda_s} z\right]$$

where z is an optical axis of said multi-channel grating, k is an indicia representing said sub-gratings, $\Lambda_s$ is a sampling period and $C_k(z)$ are amplitude coefficients of said target index profile defining a target spectral response of said optical grating;
   c) determining a modified index profile having a smooth apodization profile and providing said target spectral response at least within a spectral region of interest;
   d) encoding a phase mask according to said modified index profile; and
   e) photoinducing said multi-channel grating in the photosensitive medium using said phase mask.

16. The method according to claim 15, wherein said amplitude coefficients are represented by $$C_k(z) = \frac{\Delta n_k(z)}{\Delta n_0(z)} \exp(j(\delta\theta_k(z) + \phi_k))$$

where $\Delta n_k(Z)$ is the an individual apodization profile of each sub-grating, $\Delta n_0(k)$ is an apodization profile of the seed grating, $\delta\theta_k(z)$ is a difference between a phase shift profile of each sub-grating and a phase shift profile of the seed grating, and $\phi_k$ is a relative phases between the sub-gratings.

17. The method according to claim 16, wherein the determining of step c) comprises representing said target sampling function as a phase-only sampling function.

18. The method according to claim 17, wherein the determining of step c) further comprises decomposing a sampling phase of said phase-only sampling function as a Fourier series having spatially varying Fourier coefficients, and numerically optimizing said Fourier coefficients for each position along said optical axis of said multi-channel grating.

19. The method according to claim 17, wherein the encoding of step d) comprises modulating periodically a phase of corrugations along said phase mask according to said phase-only sampling function.

20. The method according to claim 1, wherein the encoding of step d) comprises manufacturing said phase mask with corrugations having a phase profile related to the modified index profile of the multi-channel grating through a transfer function.

21. The method according to claim 20, wherein said transfer function is given by:

$$S(f) = S_m(f) \cdot 2 \cos(\pi f \Delta z),$$

where $S_m(f)$ and $S(f)$ are Fourier spectra of a phase profile of the phase mask and of the modified index profile of the multi-channel grating, respectively, f is a spatial frequency and $\Delta z$ is a distance between two points along the phase mask from which pass two beams interfering in the photosensitive medium at a position z.

22. The method according to claim 1, wherein the photoinducing of step e) comprises the substeps of:
   i. disposing the photosensitive medium along the phase mask in close proximity thereto; and
   ii. projecting actinic radiation through said phase mask, said actinic radiation being diffracted by said phase mask to generate the multi-channel grating, said multi-channel grating being photoinduced into the photosensitive medium.

23. A method for manufacturing a phase mask for photoinducing a multi-channel optical grating in a photosensitive medium, each channel of said multi-channel grating having an individual spectral response, said method comprising the steps of:
   a) for each channel, individually designing an index profile of a sub-grating providing the corresponding individual spectral response each of said index profiles comprising an individual apodization profile and an individual phase profile of the corresponding sub-grating;
   b) determining a target index profile $\Delta n_{struct}(z)$ of the multi-channel grating based on a combination of the index profiles of said sub-gratings such that:

$$\Delta n_{struct}(z) = \Delta n_{offset} + \sum_k \Delta n_k(z) e^{j(\theta_k(z) + \phi_k)}$$

where z is an optical axis of said multi-channel grating, k is an indicia representing said sub-gratings $\Delta n_k(z)$ and $\theta_k(z)$ are respectively the individual apodization and phase profiles of each sub-grating, $\phi_k$ is a relative phases between the sub-gratings and $\Delta n_{offset}$ is an index offset selected to make the target index profile strictly positive, said target index profile defining a target spectral response of said optical grating;

c) determining a modified index profile having a smooth apodization profile and providing said target spectral response at least within a spectral region of interest; and d) encoding the phase mask according to said modified index profile.

24. The method according to claim 23, wherein step a) comprises designing each of said sub-gratings so that the individual spectral response of the corresponding channel has a specific dispersion value.

25. The method according to claim 23, wherein step a) comprises designing each of said sub-gratings so that the individual spectral response of the corresponding channel has a specific dispersion slope.

26. The method according to claim 23, wherein step a) comprises designing each of said sub-gratings so that the individual spectral response of the corresponding channel has a specific bandwidth.

27. The method according to claim 26, wherein the specific bandwidths of the individual spectral response of all of said sub-gratings are the same.

28. The method according to claim 23, wherein the determining of step b) further comprises determining an overall apodization profile and an overall phase profile of said multi-channel grating, both being dependent on said individual phase and apodization profiles of the sub-gratings.

29. The method according to claim 28, wherein the determining of the modified index profile of step c) comprises:

replacing said overall apodization profile of the target index profile by said smooth apodization profile; and translating fine structures of said overall apodization profile into said overall phase profile.

30. The method according to claim 29, wherein said translating further comprises including a phase apodization component in said modified index profile, and adjusting said phase apodization component to provide the target spectral response of the optical grating within the spectral region of interest while generating reflection features outside of the spectral region of interest.

31. The method according to claim 29, wherein said translating comprises:

adding index profiles of side band sub-gratings to said modified index profile, each of said side band sub-gratings having a spectral response in a side band outside of the spectral region of interest of said multi-channel optical grating; and iteratively adjusting the modified index profile so as to transfer said fine features structures of said overall apodization profile to said side bands.

32. The method according to claim 31, wherein said iteratively adjusting further transfers undesired features of the overall phase profile to said side bands.

33. The method according to claim 29, wherein the encoding of step d) comprises modulating a phase of corrugations along said phase mask according to said overall phase profile.

34. A method for manufacturing a phase mask for photoinducing a multi-channel optical grating in a photosensitive medium, each channel of said multi-channel grating having an individual spectral response, said method comprising the steps of:

a) for each channel, individually designing an index profile of a sub-grating providing the corresponding individual spectral response;

b) determining a target index profile of the multi-channel grating based on a combination of the index profiles of said sub-gratings such that it corresponds to a seed grating multiplied by a sampling function, said sampling function being represented by:

$$\sum_k C_k(z) \exp\left[j \frac{2\pi k}{\Lambda_s} z\right]$$

where z is an optical axis of said multi-channel grating, k is an indicia representing said sub-gratings, $\Lambda_s$ is a sampling period and $C_k(z)$ are amplitude coefficients, said target index profile defining a target spectral response of said optical grating;

c) determining a modified index profile having a smooth apodization profile and providing said target spectral response at least within a spectral region of interest; and encoding the phase mask according to said modified index profile.

35. The method according to claim 34, wherein said amplitude coefficients are represented by $$C_k(z) = \frac{\Delta n_k(z)}{\Delta n_0(z)} \exp(j(\delta\theta_k(z) + \phi_k))$$

where $\Delta n_k(Z)$ is the individual apodization profile of each sub-grating, $\Delta n_0(k)$ is an apodization profile of the seed grating, $\delta\theta_k(Z)$ is a difference between the phase shift profile of each sub-grating and a phase shift profile of the seed grating, and $\phi_k$ is a relative phases between the sub-gratings.

36. The method according to claim 35, wherein the determining of step c) comprises representing said target sampling function as a phase-only sampling function.

37. The method according to claim 36, wherein the determining of step c) further comprises decomposing a sampling phase of said phase-only sampling function as a Fourier series having spatially varying Fourier coefficients, and numerically optimizing said Fourier coefficients for each position along said optical axis of said multi-channel grating.

38. The method according to claim 36, wherein the encoding of step d) comprises modulating periodically a phase of corrugations along said phase mask according to said phase-only sampling function.

39. The method according to claim 23, wherein the encoding of step d) comprises manufacturing said phase mask with corrugations having a phase profile related to the modified index profile of the multi-channel grating through a transfer function.

40. The method according to claim 39, wherein said transfer function is given by:

$$S(f) = S_m(f) \cdot 2 \cos(\pi f \Delta z),$$

where $S_m(f)$ and $S(f)$ are Fourier spectra of a phase profile of the phase mask and of the modified index profile of the multi-channel grating, respectively, f is a spatial frequency and $\Delta z$ is a distance between two points along the phase mask from which pass two beams interfering in the photosensitive medium at a position z.

41. A phase mask for photoinducing a multi-channel optical grating, each channel of said multi-channel grating having an individual spectral response, said phase mask comprising:

a plurality of grating corrugations having a periodical spatial distribution, said spatial distribution being encoded according to an index profile having a smooth apodization profile and providing a spectral response within a spectral region of interest corresponding to a target spectral response of said multi-channel optical grating, said target spectral response being defined by a target index profile $\Delta n_{struct}(z)$ based on a combination of index profiles of a plurality of sub-gratings, the index profile of each sub-grating comprising an individual apodization profile and an individual phase profile and being selected to provide the individual spectral response of a corresponding one of said channels, said target index profile of the multi-channel grating being such that:

$$\Delta n_{struct}(z) = \Delta n_{offset} + \sum_k \Delta n_k(z) e^{i(\theta_k(z) + \phi_k)}$$

where z is an optical axis of said multi-channel grating, k is an indicia representing said sub-gratings, $\Delta n_k(z)$ and $\theta_k(z)$ are respectively the individual apodization and phase profiles of each sub-grating, $\phi_k$ is a relative phases between the sub-gratins $\Delta n_{offset}$ is an index offset selected to make the target index profile strictly positive.

42. The phase mask according to claim 41, wherein the index profile of each of said sub-gratings is such that the individual spectral response of the corresponding channel has a specific dispersion value.

43. The phase mask according to claim 41, wherein the index profile of each of said sub-gratings is such that the individual spectral response of the corresponding channel has a specific dispersion slope.

44. The phase mask according to claim 41, wherein the index profile of each of said sub-gratings is such that the individual spectral response of the corresponding channel has a specific bandwidth.

45. The phase mask according to claim 44, wherein the specific bandwidths of the individual spectral response of all of said sub-gratings are the same.

46. The phase mask according to claim 41, wherein the target profile of said multi-channel grating is defined by an overall apodization profile and an overall phase profile both dependent on individual phase and apodization profiles of the sub-gratings.

47. The phase mask according to claim 46, wherein the index profile according to which the spatial distribution is encoded comprises a translation of fine structures of said overall apodization profile into said overall phase profile.

48. A phase mask for photoinducing a multi-channel optical grating, each channel of said multi-channel grating having an individual spectral response, said phase mask comprising:

a plurality of grating corrugations having a periodical spatial distribution, said spatial distribution being encoded according to an index profile having a smooth apodization profile and providing a spectral response within a spectral region of interest corresponding to a target spectral response of said multi-channel optical grating, said target spectral response being defined by a target index profile based on a combination of index profiles of a plurality of sub-gratings, the index profile of each sub-grating being selected to provide the individual spectral response of a corresponding one of said channels, the target profile of said multi-channel grating is being defined by a seed grating multiplied by a sampling function, said sampling function being represented:

$$\sum_k C_k(z) \exp\left[j \frac{2\pi k}{\Lambda_s} z\right]$$

where z is an optical axis of said multi-channel grating, k is an indicia representing said sub-gratings, $\Lambda_s$ is a sampling period and $C_k(z)$ are amplitude coefficients.

49. The phase mask according to claim 41, wherein the spatial distribution profile of the phase mask corrugations is related to the index profile through a transfer function.

50. The phase mask according to claim 49, wherein said transfer function is given by:

$S(f) = S_m(f) \cdot 2 \cos(\pi f \Delta z)$, where $S_m(f)$ and $S(f)$ are Fourier spectra of a phase profile of the phase mask and of the index profile of the multi-channel grating, respectively, f is a spatial frequency of the index profile and $\Delta z$ is a distance between two points along the phase mask from which pass two beams interfering at a position z.

* * * * *